(12) United States Patent
Morita et al.

(10) Patent No.: US 9,093,679 B2
(45) Date of Patent: Jul. 28, 2015

(54) METHOD OF SHUTTING DOWN FUEL CELL SYSTEM

(75) Inventors: Shinjiro Morita, Utsunomiya (JP); Nobutaka Nakajima, Tochigi-ken (JP); Go Kikuchi, Utsunomiya (JP); Nobuki Koiwa, Utsunomiya (JP); Satoshi Tanimoto, Utsunomiya (JP); Kentaro Nagoshi, Utsunomiya (JP); Katsumi Hayashi, Utsunomiya (JP); Koichiro Miyata, Saitama (JP); Hiroshi Morikawa, Tochigi-ken (JP); Kaoru Yamazaki, Utsunomiya (JP); Takashi Yamamoto, Tochigi-ken (JP); Shinya Watanabe, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 595 days.

(21) Appl. No.: 13/237,248

(22) Filed: Sep. 20, 2011

(65) Prior Publication Data

US 2012/0077102 A1    Mar. 29, 2012

(30) Foreign Application Priority Data

Sep. 24, 2010   (JP) ................. 2010-214498
Sep. 24, 2010   (JP) ................. 2010-214499
Sep. 24, 2010   (JP) ................. 2010-214501
Sep. 24, 2010   (JP) ................. 2010-214502

(51) Int. Cl.
*H01M 8/04*   (2006.01)
*H01M 16/00*   (2006.01)

(52) U.S. Cl.
CPC ...... *H01M 8/04955* (2013.01); *H01M 8/04388* (2013.01); *H01M 8/04753* (2013.01); *H01M 8/04985* (2013.01); *H01M 16/006* (2013.01); *Y02E 60/50* (2013.01)

(58) Field of Classification Search
USPC .................................. 429/429, 446
See application file for complete search history.

(56) References Cited

U.S. PATENT DOCUMENTS 6,096,448 A       8/2000  Wilkinson et al.
6,514,635 B2 *    2/2003  Van Dine et al. ......... 429/429 X
(Continued)

FOREIGN PATENT DOCUMENTS

DE     101 50 386 B4     4/2003
DE     103 93 774 T5    10/2005
(Continued)

OTHER PUBLICATIONS

German Search Report from German Patent App. No. 102011083327.7 dated Mar. 27, 2012.
(Continued)

*Primary Examiner* — Maria J Laios
(74) *Attorney, Agent, or Firm* — Arent Fox LLP

(57) ABSTRACT

A method of shutting down a fuel cell system includes a first step of supplying hydrogen gas and air to a fuel cell stack to thereby cause the fuel cell stack to generate electricity, and a second step of stopping supply of the hydrogen gas, and then supplying air to the fuel cell stack so as to cause the fuel cell stack to generate electricity upon detection of a command to shut down the fuel cell stack. In the second step, when the pressure of the hydrogen gas is lowered to a preset lower-limit value based on an anode pressure, which actually is measured, the fuel cell stack is caused to stop generating electricity.

17 Claims, 17 Drawing Sheets

(56) References Cited

U.S. PATENT DOCUMENTS

| | | |
|---|---|---|
| 7,846,598 B2 | 12/2010 | Wake et al. |
| 8,221,923 B2 * | 7/2012 | Inai et al. ............ 429/429 |
| 8,399,140 B2 | 3/2013 | Takagi et al. |
| 8,557,485 B2 | 10/2013 | Halalay et al. |
| 2006/0068236 A1 | 3/2006 | Wilpsbaeumer et al. |
| 2006/0216555 A1 | 9/2006 | Shige et al. |
| 2010/0068576 A1 | 3/2010 | Hamada et al. |
| 2011/0020719 A1 | 1/2011 | Manabe et al. |
| 2011/0097636 A1 | 4/2011 | Kurrle et al. |

FOREIGN PATENT DOCUMENTS

| | | |
|---|---|---|
| DE | 10 2004 034 071 A1 | 2/2006 |
| DE | 11 2005 000 264 T5 | 1/2007 |
| DE | 698 36 593 T2 | 4/2007 |
| DE | 10 2005 046 424 B4 | 4/2008 |
| DE | 11 2008 001 357 T5 | 4/2010 |
| DE | 10 2009 056 457 A1 | 6/2010 |
| EP | 1 279 887 B1 | 12/2006 |
| JP | 2004-22487 A | 1/2004 |
| JP | 2004-362790 A | 12/2004 |
| JP | 2006-202520 A | 8/2006 |
| JP | 2008-004319 A | 1/2008 |
| JP | 2009-129879 A | 6/2009 |
| JP | 2009-231086 A | 10/2009 |
| JP | 2009-238660 A | 10/2009 |
| JP | 2010-135189 A | 6/2010 |

OTHER PUBLICATIONS

German Office Action from German Patent App. No. 102011083327.7 dated Mar. 27, 2012.
German Office Action with English translation dated Jun. 2, 2014 issued in German Patent Application No. 10 2011 083 327.7.

* cited by examiner

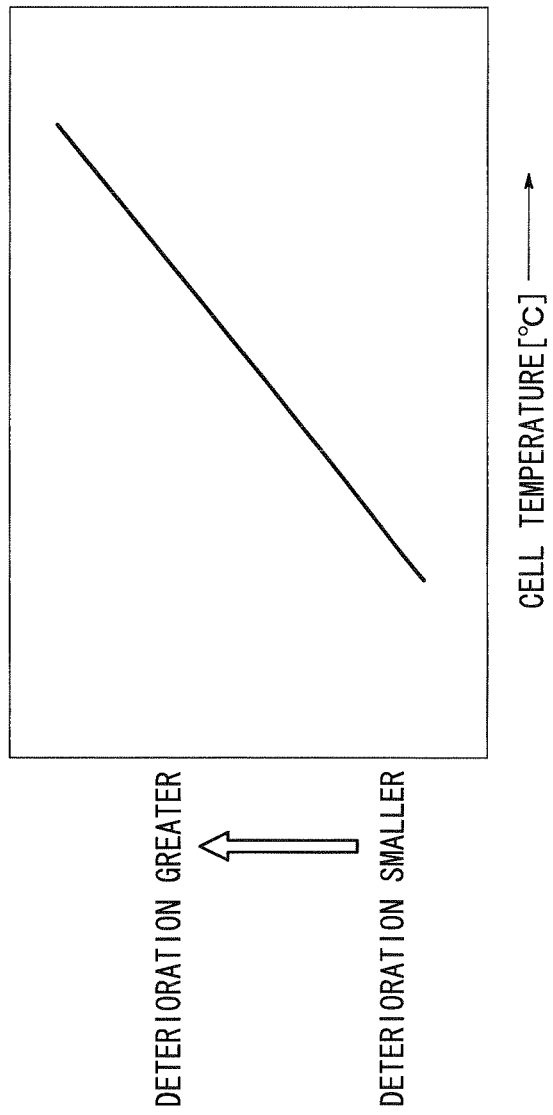

METHOD OF SHUTTING DOWN FUEL CELL SYSTEM

CROSS-REFERENCE TO RELATED APPLICATION

This application is based upon and claims the benefit of priority from Japanese Patent Applications No. 2010-214498 filed on Sep. 24, 2010, No. 2010-214499 filed on Sep. 24, 2010, No. 2010-214501 filed on Sep. 24, 2010, and No. 2010-214502 filed on Sep. 24, 2010, of which the contents are incorporated herein by reference.

BACKGROUND OF THE INVENTION

1. Field of the Invention

The present invention relates to a method of shutting down a fuel cell system, which includes a fuel cell for generating electricity from an electrochemical reaction between an oxygen-containing gas and a fuel gas.

2. Description of the Related Art

Fuel cells are used in a system for generating DC electric energy by supplying a fuel gas, i.e., a gas mainly containing hydrogen, e.g., hydrogen gas, and an oxygen-containing gas, i.e., a gas mainly containing oxygen, e.g., air, to an anode and a cathode, for thereby causing an electrochemical reaction between the fuel gas and the oxygen-containing gas. Such a system may be used as a stationary electric generating system, or may be mounted on fuel cell vehicles as an electric generating system.

Solid polymer electrolyte fuel cells, for example, incorporate a membrane electrode assembly (MEA) including an anode and a cathode disposed on respective sides of an electrolyte membrane, such as a polymer ion exchange membrane, and a pair of separators between which the membrane electrode assembly is sandwiched. A fuel gas flow field for supplying a fuel gas to the anode is defined between one of the separators and the membrane electrode assembly, and an oxygen-containing gas flow field for supplying an oxygen-containing gas to the cathode is defined between the other separator and the membrane electrode assembly.

When the fuel cell is shut down, supply of the fuel gas and the oxygen-containing gas is stopped. However, the fuel gas remains in the fuel gas flow field, and the oxygen-containing gas remains in the oxygen-containing gas flow field. If the fuel cell is shut down for a long period of time, the fuel gas and the oxygen-containing gas possibly may pass through the electrolyte membrane and mix with each other.

For example, according to Japanese Laid-Open Patent Publication No. 2004-022487, when a fuel cell is shut down, supply of the reactant gas to the cathode is cut off by an inlet cutoff valve, while the cathode outlet gas is circulated upstream of the fuel cell via a circulation line. The electrochemical reaction in the fuel cell continues to consume oxygen in the cathode outlet gas, and then an inactive gas, such as nitrogen gas, is used to purge the cathode and the anode of the fuel cell.

According to Japanese Laid-Open Patent Publication No. 2004-022487, an anode circulation line and a cathode circulation line, which circulate an anode outlet gas and a cathode outlet gas from the fuel cell to an anode gas supply line and a cathode gas supply line upstream of the fuel cell, are branched respectively from the anode gas supply line and the cathode gas supply line. The cathode circulation line is connected to a tank that serves as a gas volume region for storing nitrogen gas as an inactive gas.

As described above, the electrochemical reaction in the fuel cell continues to consume oxygen in the cathode outlet gas, and an inactive gas, such as a nitrogen gas, is used to purge the cathode and the anode of the fuel cell. Consequently, the fuel cell system is relatively complex in overall structure and large in overall size, and is highly costly to manufacture.

SUMMARY OF THE INVENTION

It is an object of the present invention to provide a method of shutting down a fuel cell system, which is simple and compact in structure, and which is capable of minimizing deterioration of a fuel cell incorporated in the fuel cell system.

According to the present invention, there is provided a method of shutting down a fuel cell system including a fuel cell for generating electricity from an electrochemical reaction between an oxygen-containing gas supplied to a cathode and a fuel gas supplied to an anode, an oxygen-containing gas supply device for supplying the oxygen-containing gas to the fuel cell, and a fuel gas supply device for supplying the fuel gas to the fuel cell.

The method comprises a first step of supplying the oxygen-containing gas and the fuel gas to the fuel cell to cause the fuel cell to generate electricity, and a second step of stopping supply of the fuel gas while supplying the oxygen-containing gas to the fuel cell to cause the fuel cell to generate electricity upon detection of a command to shut down the fuel cell.

In the second step, when pressure of the fuel gas at the anode is lowered to a preset lower-limit value based on an anode pressure, which is actually measured, the fuel cell is caused to stop generating electricity.

According to the present invention, there also is provided another method of shutting down a fuel cell system. The method comprises a first step of supplying an oxygen-containing gas and a fuel gas to a fuel cell to cause the fuel cell to generate electricity, and a second step of stopping supply of the fuel gas and supplying the oxygen-containing gas to the fuel cell at a low oxygen stoichiometry, which is lower than the oxygen stoichiometry in a normal electric generation mode of the fuel cell, to thereby cause the fuel cell to generate electricity upon detection of a command to shut down the fuel cell.

When the second step is finished, the pressure at which the fuel gas is supplied is increased or lowered before the fuel gas stops being supplied, in order to keep the pressure of the fuel gas at a constant pressure or higher in the fuel cell.

According to the present invention, there also is provided another method of shutting down a fuel cell system including a fuel cell for generating electricity from an electrochemical reaction between an oxygen-containing gas supplied to a cathode and a fuel gas supplied to an anode, an oxygen-containing gas supply device for supplying the oxygen-containing gas to the fuel cell, a fuel gas supply device for supplying the fuel gas to the fuel cell, and an electric storage device connectable to the fuel cell.

The method comprises a step of supplying the oxygen-containing gas and the fuel gas to the fuel cell to cause the fuel cell to generate electricity, a step of stopping supply of the fuel gas and supplying the oxygen-containing gas to the fuel cell at a low oxygen stoichiometry, which is lower than the oxygen stoichiometry in a normal electric generation mode of the fuel cell, to thereby cause the fuel cell to generate electricity upon detection of a command to shut down the fuel cell, and a step of supplying the electricity generated by the fuel cell to the electric storage device.

According to the present invention, there also is provided yet another method of shutting down a fuel cell system including a fuel cell for generating electricity from an electrochemical reaction between an oxygen-containing gas supplied to a cathode and a fuel gas supplied to an anode, an oxygen-containing gas supply device for supplying the oxygen-containing gas to the fuel cell, a fuel gas supply device for supplying the fuel gas to the fuel cell, a coolant supply device for supplying a coolant to the fuel cell, and an electric storage device connectable to the fuel cell.

The method comprises a first step of supplying the oxygen-containing gas and the fuel gas to the fuel cell to cause the fuel cell to generate electricity, a second step of stopping supply of the fuel gas and supplying the oxygen-containing gas to the fuel cell at a low oxygen stoichiometry, which is lower than the oxygen stoichiometry in a normal electric generation mode of the fuel cell, to cause the fuel cell to generate electricity, and supplying the electricity generated by the fuel cell to the electric storage device upon detection of a command to shut down the fuel cell, and a third step of stopping supply of the oxygen-containing gas at the low oxygen stoichiometry to the fuel cell, thereafter causing the fuel cell to generate electricity only with gases that remain in the fuel cell, and supplying the electricity generated by the fuel cell to the coolant supply device.

According to the present invention, since the fuel cell generates electricity with the fuel gas remaining therein together with the oxygen-containing gas supplied thereto, the hydrogen concentration in the fuel gas within the fuel cell is lowered. As a result, hydrogen does not pass from the anode through an electrolyte membrane to the cathode and does not react with oxygen at the cathode. The electrolyte membrane thus is prevented from becoming deteriorated.

When pressure of the fuel gas at the anode is lowered to the preset lower-limit value based on the anode pressure, which is actually measured, the fuel cell is caused to stop generating electricity. The potential at the anode does not rise sharply due to a shortage of fuel gas, thereby making it possible to prevent the fuel cell from becoming deteriorated as much as possible.

According to the present invention, furthermore, as the fuel cell generates electricity with the fuel gas remaining therein, and with the oxygen-containing gas at the low oxygen stoichiometry, the fuel cell produces an inactive gas having a high nitrogen concentration as a discharged gas, whereby the hydrogen concentration in the fuel gas in the fuel cell is reduced. The cathode is filled with nitrogen gas having a reduced oxygen concentration, thereby filling the fuel cell and the gas passageways with nitrogen gas.

Inasmuch as the pressure at which the fuel gas is supplied is increased or reduced before the fuel gas stops being supplied, the fuel cell generates electricity suitably at a low oxygen stoichiometry while the fuel cell is being filled with an appropriate amount of hydrogen. When the fuel cell generates electricity at such a low oxygen stoichiometry, the amount of hydrogen is prevented from becoming insufficient or excessive. The fuel cell is prevented from becoming deteriorated insofar as possible with a simple and compact arrangement.

According to the present invention, as described above, since the fuel cell generates electricity with the fuel gas remaining therein, and while the oxygen-containing gas remains at a low oxygen stoichiometry, the fuel cell produces an inactive gas having high nitrogen concentration as a discharged gas, and the hydrogen concentration in the fuel gas in the fuel cell is reduced. After the generated electricity is supplied to the electric storage device, the electricity that has been generated only with the remaining gases is supplied to the coolant supply device.

Since the residual voltage of the fuel cell can be lowered to a low voltage, oxygen concentration in the fuel cell can further be reduced. Therefore, the cathode is filled with nitrogen gas having a reduced oxygen concentration, thereby filling the fuel cell and the gas passageways with nitrogen gas.

The fuel cell is cooled by the coolant supply device. Consequently, the fuel cell, which generally is more likely to become deteriorated at higher temperatures, is not exposed to high temperatures, and is suitably prevented from becoming deteriorated while being shut down, and also from becoming deteriorated when the fuel cell starts to operate. The fuel cell thus is prevented, with a simple and compact arrangement, from becoming deteriorated as much as possible.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 17 is a diagram showing a relationship between cell temperature and membrane deterioration.

DESCRIPTION OF THE PREFERRED EMBODIMENTS

Figure 1:
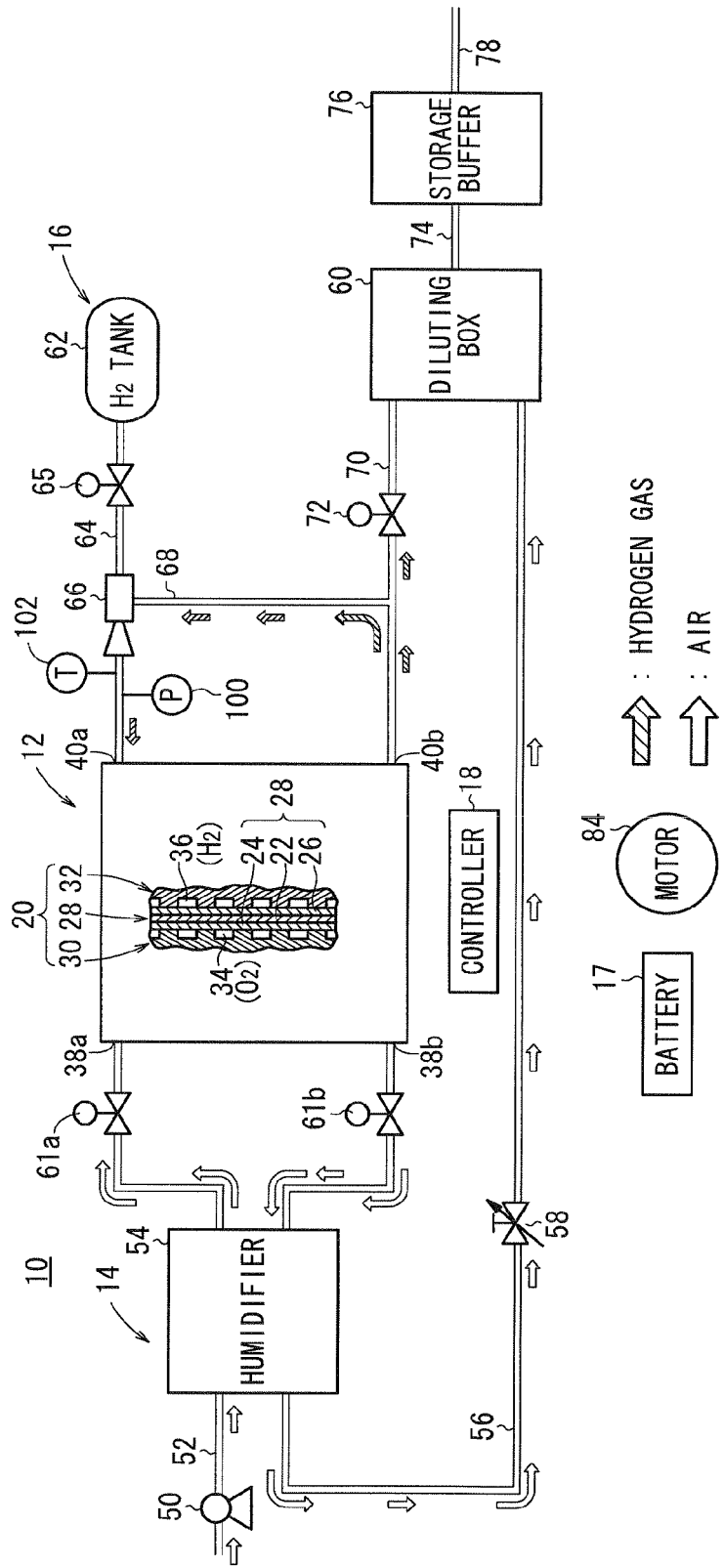
FIG. 1 is a schematic diagram of a fuel cell system on which a method of shutting down a fuel cell system according to a first embodiment of the present invention is carried out.

FIG. 1 schematically shows a fuel cell system 10 on which a method of shutting down a fuel cell system according to a first embodiment of the present invention is carried out. As shown in FIG. 1, the fuel cell system 10 includes a fuel cell stack 12, an oxygen-containing gas supply device 14 for supplying an oxygen-containing gas to the fuel cell stack 12, a fuel gas supply device 16 for supplying a fuel gas to the fuel cell stack 12, a battery (electric storage device) 17 connectable to the fuel cell stack 12, and a controller 18 for controlling the fuel cell system 10 in its entirety. The fuel cell system 10 is mounted on a fuel cell vehicle such as a fuel cell automobile or the like. A battery 17 is capable of storing electricity for propelling the fuel cell vehicle under normal conditions. The battery 17 is capable of supplying a current of 20 A at a voltage of up to 500 V, which is higher in voltage power capacity than a 12-V power supply 98 (FIG. 2), to be described later.

The fuel cell stack 12 is constructed from a plurality of stacked fuel cells 20. Each of the fuel cells 20 incorporates a membrane electrode assembly (MEA) 28 including a solid polymer electrolyte membrane 22 in the form of a thin membrane of perfluorosulfonic acid impregnated with water, together with a cathode 24 and an anode 26, which sandwich the solid polymer electrolyte membrane 22 therebetween.

Each of the cathode 24 and the anode 26 has a gas diffusion layer made of carbon paper or the like, and an electrode catalyst layer made of porous carbon particles carrying a platinum alloy or Ru or the like on surfaces thereof, and which is uniformly deposited to the surface of the gas diffusion layer. The electrode catalyst layer is disposed on each of both sides of the solid polymer electrolyte membrane 22.

The membrane electrode assembly 28 is sandwiched between a cathode separator 30 and an anode separator 32. Each of the cathode separator 30 and the anode separator 32 comprises a carbon separator or a metal separator.

An oxygen-containing gas flow field 34 is defined between the cathode separator 30 and the membrane electrode assembly 28, and a fuel gas flow field 36 is defined between the anode separator 32 and the membrane electrode assembly 28.

The fuel cell stack 12 has an oxygen-containing gas inlet passage 38a extending through the stacked fuel cells 20 for supplying an oxygen-containing gas, e.g., an oxygen-containing gas (hereinafter also referred to as "air"), a fuel gas inlet passage 40a extending through the stacked fuel cells 20 for supplying a fuel gas, e.g., a hydrogen-containing gas (hereinafter also referred to as "hydrogen gas"), a coolant inlet passage, not shown, extending through the stacked fuel cells 20 for supplying a coolant, an oxygen-containing gas outlet passage 38b extending through the stacked fuel cells 20 for discharging the oxygen-containing gas, a fuel gas outlet passage 40b extending through the stacked fuel cells 20 for discharging the fuel gas, and a coolant outlet passage, not shown, extending through the stacked fuel cells 20 for discharging the coolant.

The oxygen-containing gas supply device 14 includes an air pump 50 for compressing atmospheric air and for supplying compressed atmospheric air. The air pump 50 is connected to an air supply passageway 52. The air supply passageway 52 is connected to a humidifier 54, which exchanges water and heat between a supplied gas and a discharged gas. The air supply passageway 52 extends through the humidifier 54 and is held in fluid communication with the oxygen-containing gas inlet passage 38a of the fuel cell stack 12.

The oxygen-containing gas supply device 14 also includes an air discharge passageway 56, which is held in fluid communication with the oxygen-containing gas outlet passage 38b of the fuel cell stack 12. The air discharge passageway 56 is connected to a humidifying medium passage (not shown) of the humidifier 54. The air discharge passageway 56 also is connected to a back pressure control valve 58, an opening of which is adjustable for regulating the pressure of air that is supplied from the air pump 50 through the air supply passageway 52 to the fuel cell stack 12. The back pressure control valve 58 should preferably comprise a normally closed back pressure valve, which is closed when a solenoid thereof is not energized.

The air discharge passageway 56 is held in fluid communication with a diluting box 60. The air supply passageway 52 and the air discharge passageway 56 are connected respectively to on-off valves 61a, 61b, which are located proximate the oxygen-containing gas inlet passage 38a and the oxygen-containing gas outlet passage 38b, respectively.

The fuel gas supply device 16 includes a hydrogen tank 62 for storing hydrogen gas under high pressure. The hydrogen tank 62 is connected to the fuel gas inlet passage 40a through a hydrogen supply passageway 64. The hydrogen supply passageway 64 is connected to a shutoff valve 65 and an ejector 66. The ejector 66 supplies hydrogen gas, which is delivered from the hydrogen tank 62, to the fuel cell stack 12 through the hydrogen supply passageway 64, and draws a discharged gas containing unused hydrogen gas from the fuel cell stack 12 from a hydrogen circulation path 68, and resupplies the discharged gas as a fuel gas to the fuel cell stack 12.

The fuel gas outlet passage 40b is held in fluid communication with an off-gas passageway 70, which also is connected to the hydrogen circulation path 68. The diluting box 60 is connected to the off-gas passageway 70 through a purge valve 72. The diluting box 60 has a discharge outlet connected to a discharge passageway 74, which is connected to a storage buffer 76. The storage buffer 76 is connected to an exhaust passageway 78.

Figure 2:
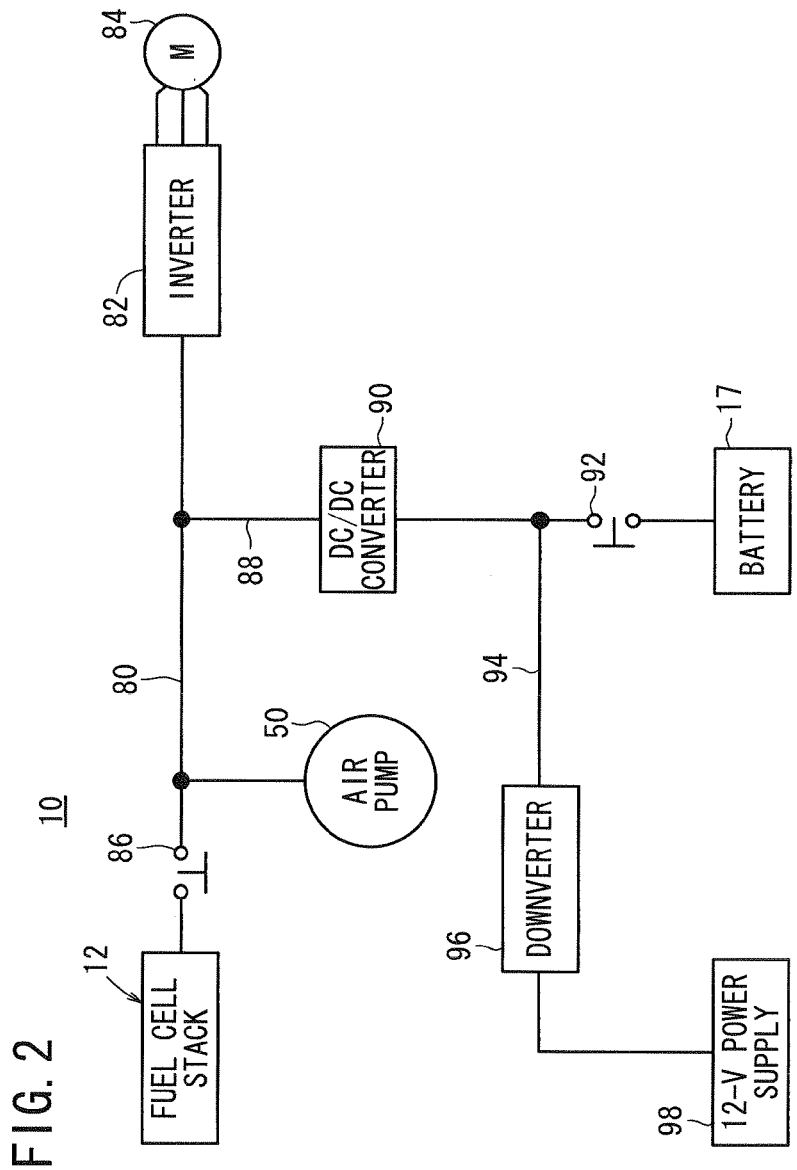
FIG. 2 is a block diagram of the fuel cell system.

As shown in FIG. 2, the fuel cell stack 12 is connected to one end of a bus line 80, while the other end of the bus line 80 is connected to an inverter 82. The inverter 82 is connected to a three-phase driver motor 84 for propelling the fuel cell vehicle. Although the bus line 80 actually comprises two lines, for the sake of brevity, the bus line 80 has been illustrated as a single line. This also holds true for other lines, to be described later.

The bus line 80 comprises an FC contactor 86 through which the bus line 80 is connected to the air pump 50. The bus line 80 also is connected to an end of a power line 88, which is connected to the battery 17 through a DC/DC converter 90 and a battery contactor 92. A branch power line 94, which is connected to the 12-V power supply 98 through a downverter (DC/DC converter) 96, branches from the power line 88. The 12-V power supply 98 is not limited to a voltage of 12 V, but may have other voltages, insofar as such voltages are lower than the voltage of the battery 17.

As shown in FIG. 1, a pressure sensor 100 for detecting an anode gas pressure (anode pressure), and a temperature sensor 102 for detecting an anode gas temperature, are connected to the hydrogen supply passageway 64 near the fuel gas inlet passage 40a of the fuel cell stack 12.

Operations of the fuel cell system 10 will be described below.

When the fuel cell system 10 is placed in operation, the air pump 50 of the oxygen-containing gas supply device 14 delivers air to the air supply passageway 52. The air delivered to the air supply passageway 52 is humidified by the humidifier 54, and then is supplied to the oxygen-containing gas inlet passage 38a of the fuel cell stack 12. In the fuel cell stack 12, air flows through the oxygen-containing gas flow field 34 to the cathode 24 of each of the fuel cells 20.

Air, which has been used by the fuel cells 20, is discharged from the oxygen-containing gas outlet passage 38b into the air discharge passageway 56. The air is delivered via the air discharge passageway 56 to the humidifier 54, in which the air is used to humidify newly supplied air. Thereafter, the air is introduced through the back pressure control valve 58 into the diluting box 60. In the diluting box 60, hydrogen gas is mixed with the air off-gas in order to reduce the hydrogen concentration therein, and then is discharged into the storage buffer 76.

In the fuel gas supply device 16, the shutoff valve 65 is opened so as to deliver hydrogen gas from the hydrogen tank 62. Hydrogen gas delivered from the hydrogen tank 62 is reduced in pressure by a pressure reducing valve, not shown, and then is supplied to the hydrogen supply passageway 64. The hydrogen gas then flows through the hydrogen supply passageway 64 to the fuel gas inlet passage 40a of the fuel cell stack 12. In the fuel cell stack 12, the hydrogen gas flows through the fuel gas flow field 36 to the anode 26 of each of the fuel cells 20.

Hydrogen, which has been used by the fuel cells 20, is discharged from the fuel gas outlet passage 40b and then is drawn through the hydrogen circulation path 68 to the ejector 66, which resupplies the hydrogen gas as a fuel gas to the fuel cell stack 12. The air, which is supplied to the cathode 24, and the hydrogen gas, which is supplied to the anode 26, react electrochemically with each other, thereby generating electricity.

The hydrogen gas that circulates in the hydrogen circulation path 68 tends to contain impurities. When the purge valve 72 is opened, the hydrogen gas containing impurities is introduced into the diluting box 60. In the diluting box 60, the hydrogen gas is mixed with the air off-gas in order to reduce the hydrogen concentration therein, and then is discharged into the storage buffer 76.

A method of shutting down the fuel cell system 10 according to the first embodiment will be described below with reference to the timing chart shown in FIG. 3 and the flowchart shown in FIG. 4.

First, a discharge test is conducted by stopping supply of the hydrogen gas to the anodes, and drawing current while supplying air to the cathodes. The hydrogen gas partial pressure, i.e., the fuel gas pressure at the anodes, is used as a standard for judging shortage of hydrogen gas, i.e., a standard for judging an increase in the anode potential at a single anode 26, which is reflected in a control process for stopping the discharge process.

Figure 5:
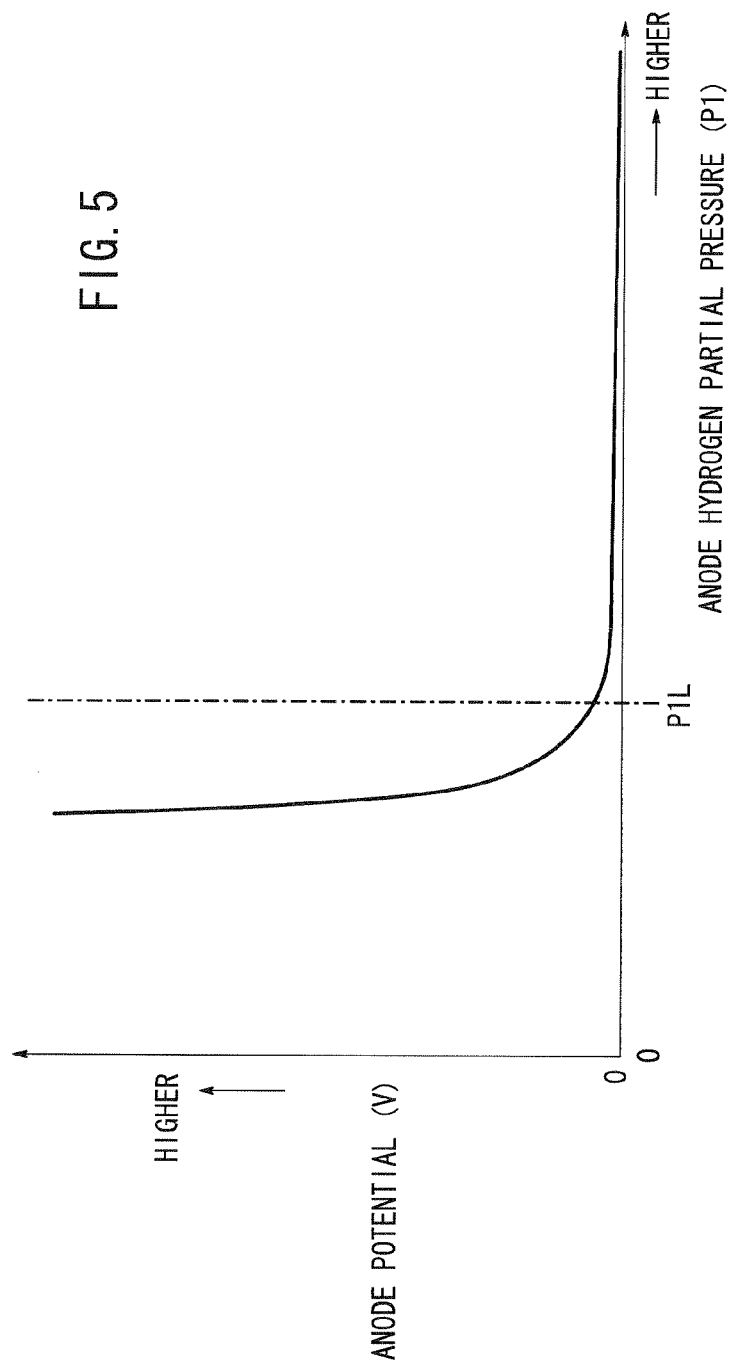
FIG. 5 is a diagram showing a relationship between anode pressure and anode potential.

A discharge test was conducted using the fuel cell stack 12 according to the first embodiment. In this test, as shown in FIG. 5, it was found that the hydrogen gas partial pressure P1 at the anodes and the anode potential are related to each other. From FIG. 5, it can be seen that the anode potential does not rise sharply, provided that the hydrogen gas partial pressure P1 is equal to or higher than a preset lower-limit value P1L. The preset lower-limit value P1L serves as an anode critical pressure.

The hydrogen gas partial pressure P1 is of a value produced by subtracting a water vapor partial pressure P3 from an anode pressure P2. Consequently, the water vapor partial pressure P3, which corresponds to a detected temperature, is determined from a map of temperatures and water vapor partial pressures P3, whereas the hydrogen gas partial pressure P1 is calculated by subtracting the water vapor partial pressure P3 from the anode pressure P2.

Figure 6:
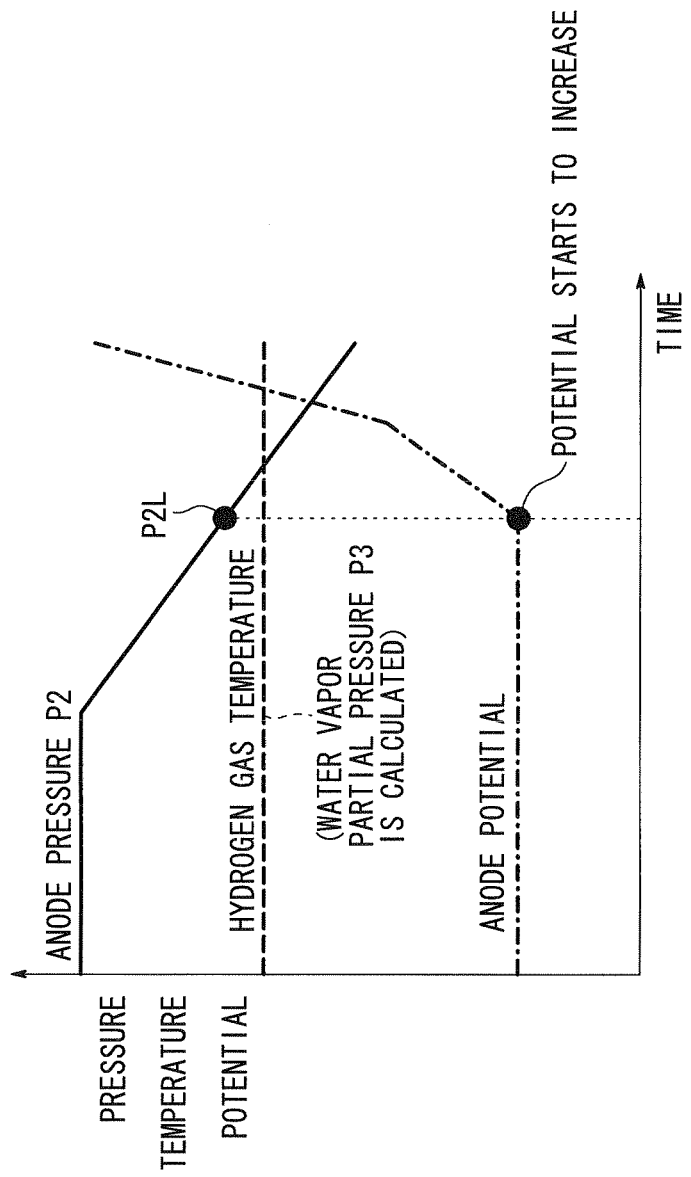
FIG. 6 is a diagram showing a relationship between anode pressure, anode potential, and hydrogen gas temperature.

FIG. 6 shows the relationship between anode pressure P2, hydrogen gas temperature, and anode potential. A preset lower-limit value P1L for the hydrogen gas partial pressure P1 is established based on the anode pressure P2L, at which the anode potential begins to rise sharply (P2L−P3=P1L).

Figure 4:
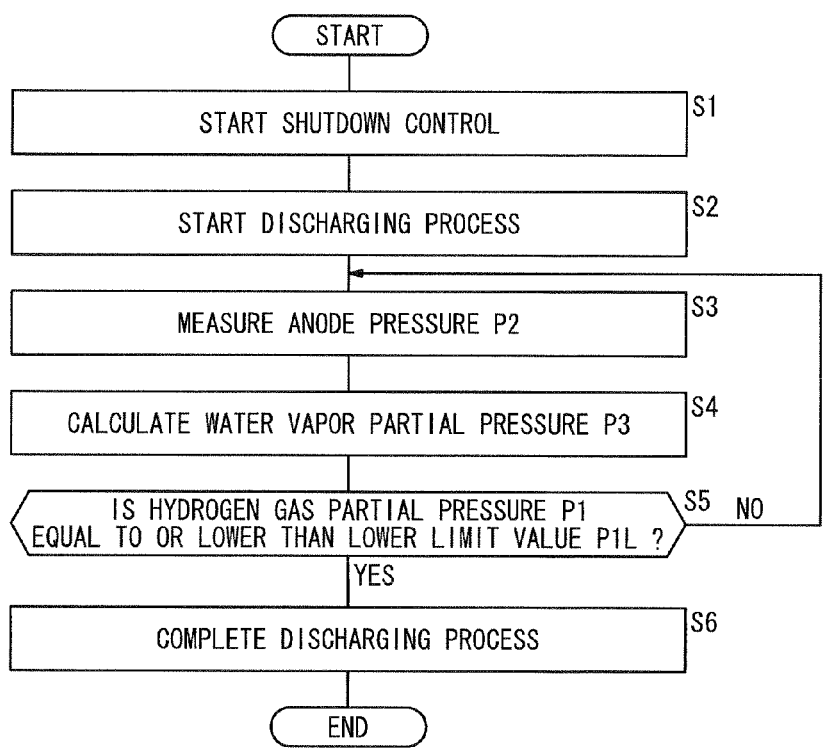
FIG. 4 is a flowchart illustrative of the method of shutting down a fuel cell system according to the first embodiment.

When an ignition switch (not shown) of the fuel cell automobile is turned off, the method of shutting down the fuel cell system 10 is started (step S1 in FIG. 4).

Figure 7:
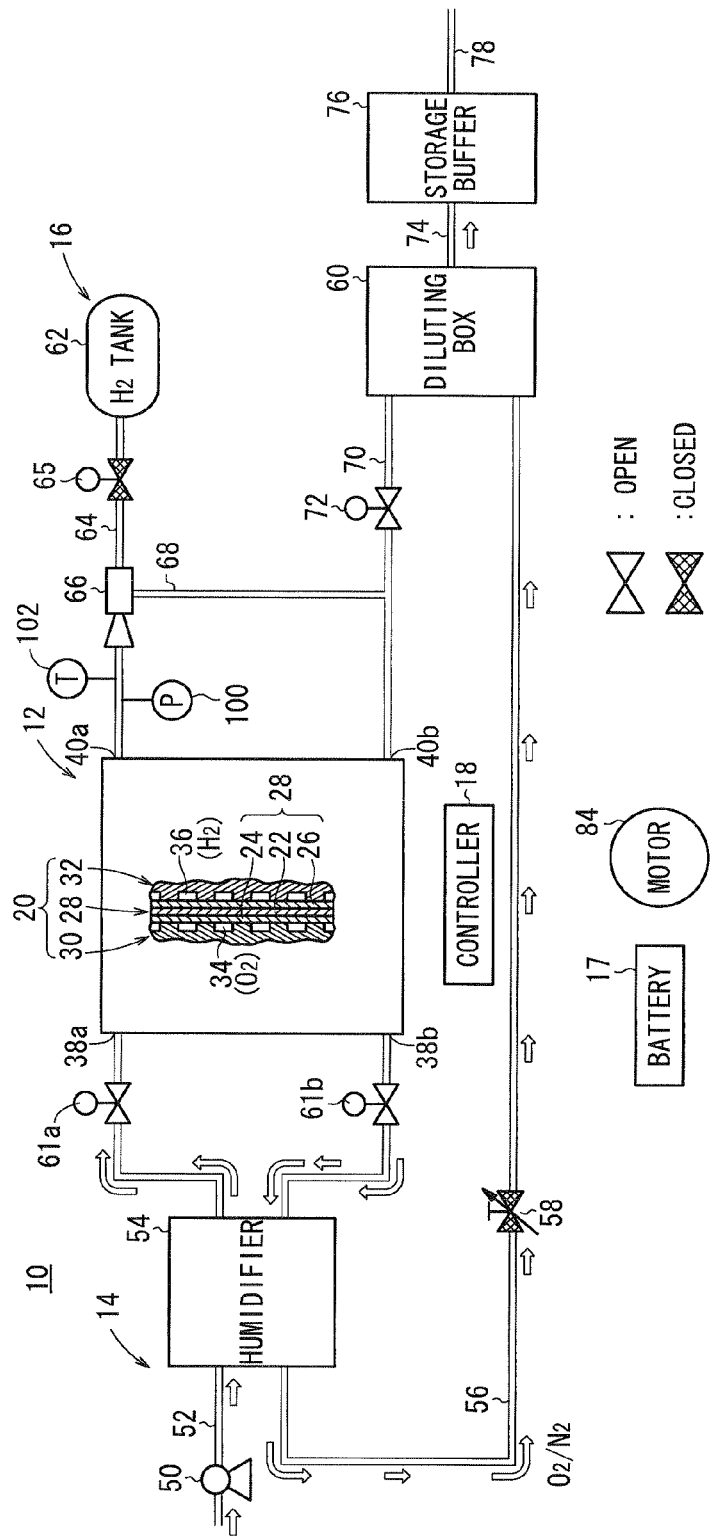
FIG. 7 is a schematic diagram that illustrates operations of the fuel cell system.

After elapse of a predetermined time including a failure detection time, for example, from turning-off of the ignition switch, a discharging process is started (step S2). More specifically, the shutoff valve 65 is closed, and the back pressure control valve 58 is closed by stopping the opening process thereof (see FIG. 7).

The air pump 50 of the oxygen-containing gas supply device 14 has the rotational speed thereof reduced considerably compared with the rotational speed in normal operation, so as to supply the oxygen-containing gas at a low oxygen stoichiometry, which is lower than the oxygen stoichiometry in a normal electric generation mode of the fuel cell stack 12. The low oxygen stoichiometry is set to about 1. If necessary, the air pump 50 may be operated at the same rotational speed as the rotational speed during normal operation, although during such times the oxygen stoichiometry is not limited to the low oxygen stoichiometry.

The fuel cell stack 12 continues to generate electricity having a voltage (FC voltage) set to a higher voltage level than in the normal electric generation mode. Current collected from the fuel cell stack 12 (FC current) is set to a value that blocks hydrogen gas as the fuel gas from passing through the solid polymer electrolyte membranes 22 and moving from the anodes toward the cathodes. In FIG. 2, the FC contactor 86 and the battery contactor 92 are turned on, thereby allowing the electricity generated by the fuel cell stack 12 to be supplied to charge the battery 17, after the voltage thereof has been reduced by the DC/DC converter 90.

As described above, the fuel cell stack 12 is supplied with air at a low oxygen stoichiometry, and the fuel cell stack 12 generates electricity while the fuel cell stack 12 is not supplied with hydrogen gas, due to the shutoff valve 65 being closed. Electricity generated by the fuel cell stack 12 is discharged as a result of being supplied to the battery 17 (battery DCHG in FIG. 3). When the voltage of the electricity generated by the fuel cell stack 12 drops to a given voltage, i.e., to a voltage N1 (V) that is no longer applicable to the battery 17 and which is substantially the same as the voltage across the battery 17, the generated electricity is supplied only to the air pump 50.

In the fuel cell stack 12, concentration of hydrogen at the anodes is lowered, and concentration of oxygen at the cathodes is lowered. When the hydrogen pressure at the anodes becomes equal to or lower than a predetermined pressure, the air pump 50 is turned off, and the battery contactor 92 is turned off. The predetermined pressure refers to a pressure at which the voltage of the generated electricity is too low to actuate the air pump 50.

Figure 8:
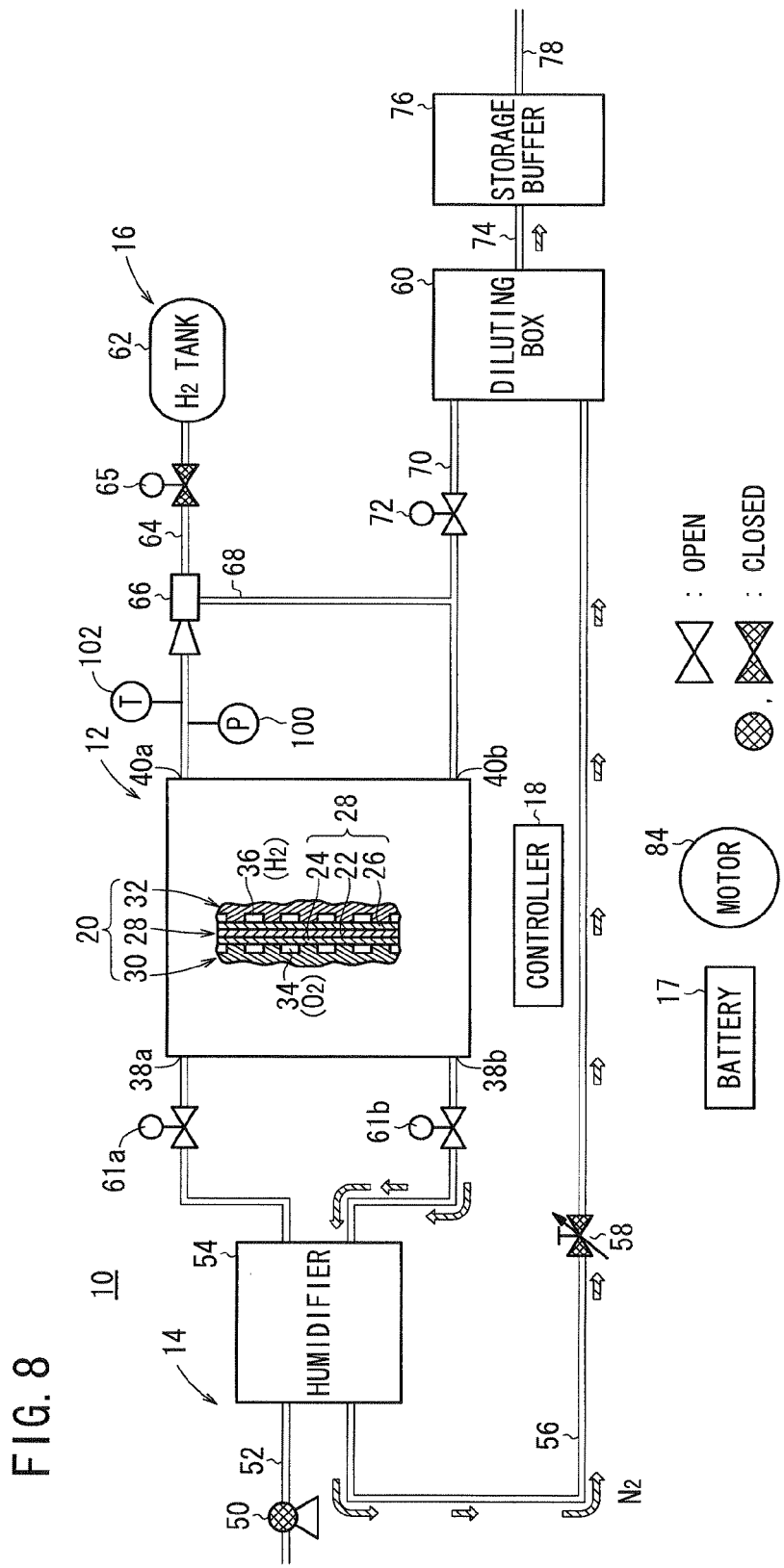
FIG. 8 is a schematic diagram that illustrates operations of the fuel cell system.

As shown in FIG. 8, the fuel cell stack 12 generates electricity with the hydrogen gas and air that remain therein. The voltage of the electricity generated by the fuel cell stack 12 is lowered by the downverter 96, and is then supplied in order to charge the 12-V power supply 98 (D/V DCHG in FIG. 3). If necessary, the voltage may also be supplied to a radiator fan or the like, not shown. When the voltage of the electricity generated by the fuel cell stack 12 is lowered to a level approaching the limit operating voltage of the downverter 96, the back pressure control valve 58 is temporarily opened to atmospheric pressure, and the FC contactor 86 is turned off.

During the above discharging process, the controller 18 detects, through the pressure sensor 100, the anode pressure P2 including the pressure of hydrogen gas supplied to the fuel cell stack 12 (step S3), and the controller 18 also detects the hydrogen gas temperature, i.e., the anode gas temperature, through the temperature sensor 102. The controller 18 calculates a water vapor partial pressure P3 from the detected hydrogen gas temperature, and calculates a hydrogen gas partial pressure P1 by subtracting the water vapor partial pressure P3 from the detected anode pressure P2.

Then it is determined whether or not the calculated hydrogen gas partial pressure P1 is equal to or higher than the preset lower-limit value P1L for the fuel gas pressure (step S5). If it is judged that the calculated hydrogen gas partial pressure P1 is equal to or higher than the preset lower-limit value P1L for the fuel gas pressure (YES in step S5), then control proceeds to step S6, at which time the discharging process is completed. More specifically, the back pressure control valve 58 is temporarily opened to atmospheric pressure, and the FC contactor 86 is turned off.

According to the first embodiment, when the ignition switch is turned off, the back pressure control valve 58, the air pump 50, and the shutoff valve 65 are actuated. Therefore, the fuel cell stack 12 generates electricity with the hydrogen gas and air that remain therein, and the generated electricity is discharged as a result of being supplied to the battery 17.

The concentration of hydrogen is reduced at each of the anodes in the fuel cell stack 12, and the concentration of oxygen is reduced and nitrogen is increased at each of the cathodes in the fuel cell stack 12. At the cathodes, nitrogen gas having a high concentration is generated as a discharged gas, and the nitrogen gas is supplied to the diluting box 60 and the storage buffer 76. At the anodes, a negative pressure is developed due to the reduced concentration of hydrogen, thereby allowing the nitrogen gas to pass through the solid polymer electrolyte membranes 22 from the cathodes to the anodes.

No hydrogen passes to and reacts with oxygen at the cathodes, so the solid polymer electrolyte membranes 22 are suitably prevented from becoming deteriorated. The fuel cell stack 12 together with the gas pipes connected thereto is filled with nitrogen gas as an inactive gas. The fuel cells 20 thus are prevented from becoming deteriorated as much as possible.

Figure 3:
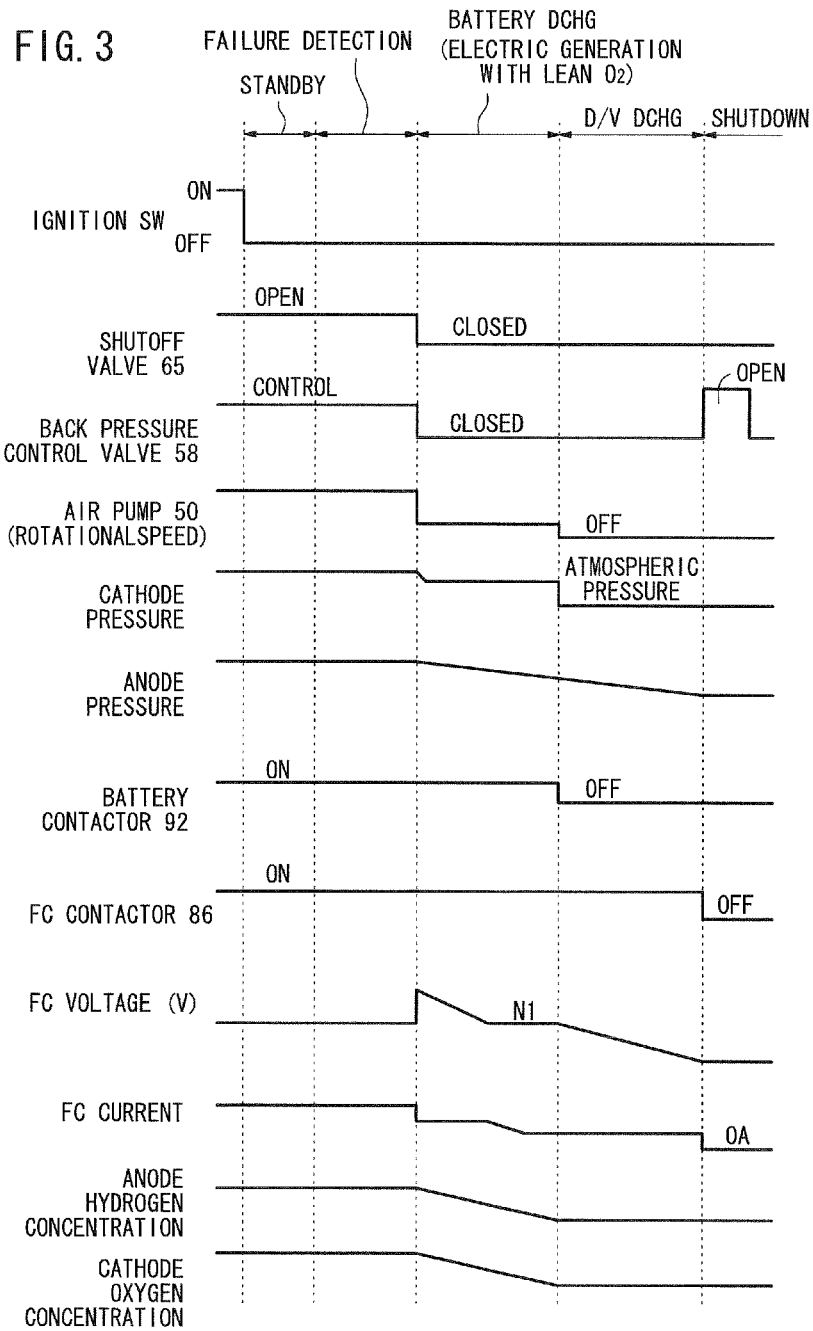
FIG. 3 is a timing chart illustrative of the method of shutting down a fuel cell system according to the first embodiment.

According to the first embodiment, by turning off the air pump 50 while the fuel cell stack 12 is not supplied with air, the fuel cell stack 12 generates electricity only with the hydrogen and oxygen that remain therein (D/V DCHG in FIG. 3).

Figure 9:
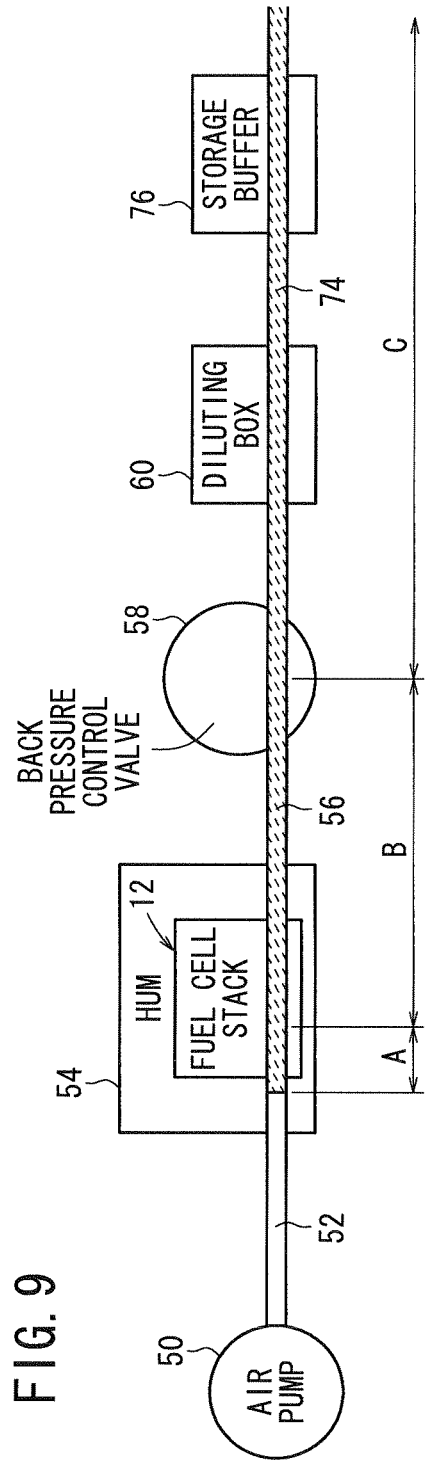
FIG. 9 is a block diagram illustrative of a nitrogen replaced state in the fuel cell system.

As shown in FIG. 9, if the fuel cell stack 12 generates electricity while being supplied with air from the air pump 50, the fuel cell system 10 has a nitrogen replacement range, including a range B and a range C. When the air pump 50 is turned off and the fuel cell stack 12 generates electricity, the nitrogen replacement range expands into a range A at the inlet of the fuel cell stack 12. Accordingly, even when the fuel cell system 10 is shut down for a relatively long period of time, the fuel cells 20 are prevented from becoming deteriorated as much as possible.

According to the first embodiment, furthermore, the correlation between the hydrogen gas partial pressure P1 at the anodes and the anode potential is determined, and the hydrogen gas partial pressure P1 is used as a judgment standard for avoiding an increase in anode potential. When the hydrogen gas partial pressure P1 reaches the preset lower-limit value P1L based on the actually measured anode pressure P2, the fuel cell stack 12 stops generating electricity.

At this time, the cell voltage of the fuel cells 20 (FC voltage) may be detected, and the time at which the discharging process is stopped may be judged depending on a reduction in the cell voltage. However, the cell voltage may also be lowered either by an increase in the anode potential or a reduction in the cathode potential, although it may not be possible to judge whether the reduction in cell voltage is attributed to an increase in the anode potential or a reduction in the cathode potential.

According to the first embodiment, by judging an increase in the anode potential based on the hydrogen gas partial pressure P1, the anode potential does not suffer from sharp increases due to a shortage of fuel gas, and it is possible to prevent the fuel cells 20 from becoming deteriorated. Consequently, it is possible to minimize deterioration of the fuel cells 20 with a simple and compact arrangement.

According to the first embodiment, the hydrogen gas partial pressure P1 is calculated in view of the water vapor partial pressure P3. As hydrogen gas is consumed to the lower limit thereof, as represented by the hydrogen gas partial pressure P1, any hydrogen remaining in the fuel cell stack 12 is reduced as much as possible.

Figure 10:
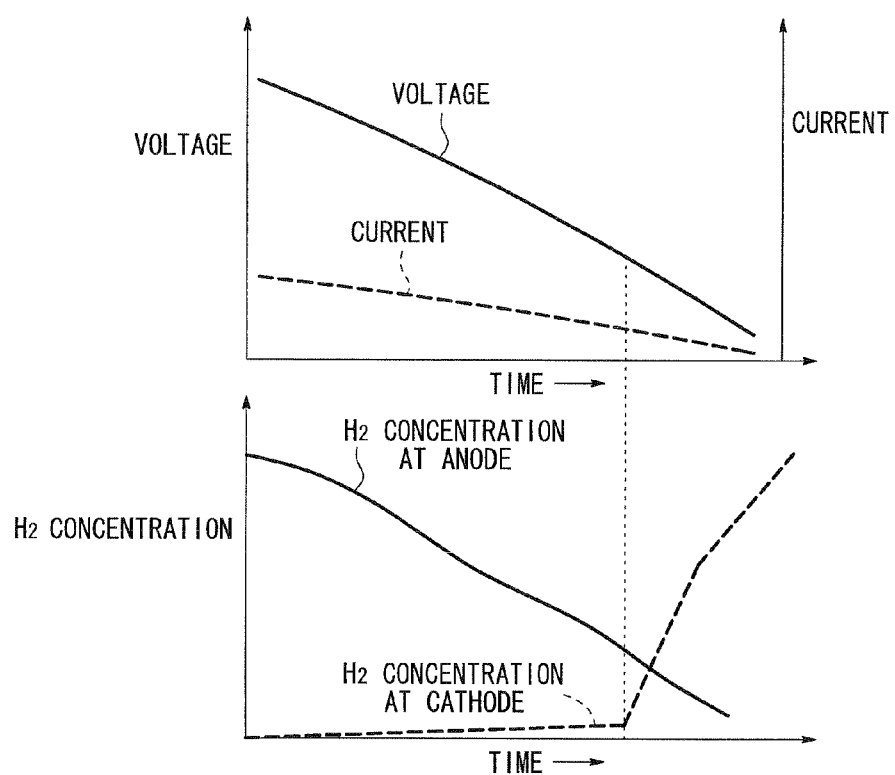
FIG. 10 is a diagram showing a relationship between current, voltage, and hydrogen displacement.

According to the first embodiment, furthermore, the current and voltage collected when the fuel cell stack 12 generates electricity at a low oxygen stoichiometry are set to constant values, so as not to displace hydrogen from the anodes to the cathodes. The generated current, the cell voltage, and the hydrogen displacement are related to each other, as shown in FIG. 10. Since the hydrogen displacement depends on the voltage, as shown in FIG. 10, it is necessary to control the hydrogen displacement by varying the current. To control the hydrogen displacement, it is preferable to operate the fuel cell stack 12 by controlling the voltage thereof.

According to the first embodiment, furthermore, when the voltage generated by the fuel cell stack 12 is lowered to a preset voltage value Ni (V) or lower, the generated electricity stops being supplied to the battery 17, and is supplied only to the air pump 50. Even after the generated electricity can no longer be supplied to the battery 17, the generated electricity is supplied to the air pump 50, thus making it possible for the fuel cell stack 12 to continue generating electricity.

Moreover, the low oxygen stoichiometry of the oxygen gas is set to about 1. When the fuel cell stack 12 generates electricity, the fuel cell stack 12 consumes oxygen substantially completely, to effectively increase the nitrogen gas concentration, and passage of hydrogen from the anodes to the cathodes due to a shortage of supplied oxygen is prevented.

The oxygen stoichiometry should preferably be set to a value that becomes higher as the ambient temperature is lower. This is because, when the temperature at which the fuel cell system 10 is shut down is low, the amount of gas drawn in from the external source, i.e., the amount of drawn in air, becomes reduced due to a reduction in the temperature of the fuel cell stack 12 and the humidifier 54, so that desired effects are achieved, even if a reduction in the amount of oxygen in the fuel cell system 10 is low.

Moreover, when the fuel cell stack 12 generates electricity after the supply of air thereto is stopped, the fuel cell stack 12 supplies the generated electricity to the 12-V power supply 98. The 12-V power supply 98 supplies electricity to auxiliaries of the fuel cell stack 12. The electricity generated by the fuel cell stack 12 at this time is consumed, i.e., discharged, reliably.

After the fuel cell system 10 has been shut down, the back pressure control valve 58 is temporarily opened to fill the fuel cell stack 12 with nitrogen gas supplied under a negative pressure to the diluting box 60 and the storage buffer 76.

Then, electricity stops being supplied to the back pressure control valve 58, thereby closing the back pressure control valve 58, which is of a normally closed type. As a consequence, the back pressure control valve 58 can be controlled simply, and oxygen is prevented from being introduced into the fuel cell stack 12.

The oxygen-containing gas supply device 14 includes the on-off valves 61a, 61b located proximate the oxygen-containing gas inlet passage 38a and the oxygen-containing gas outlet passage 38b, respectively, of the fuel cell stack 12. After the fuel cell system 10 has been shut down, the on-off valves 61a, 61b are closed to prevent air from being introduced into the fuel cell stack 12 as much as possible.

The diluting box 60 is disposed downstream of the back pressure control valve 58. The diluting box 60 stores nitrogen gas, which is produced when the fuel cell system 10 generates electricity using air at a low oxygen stoichiometry. When a negative pressure is developed in the fuel cell stack 12 after the fuel cell system 10 has been shut down, nitrogen gas is supplied to or is drawn from the diluting box 60 into the fuel cell stack 12.

The storage buffer 76 is disposed downstream of the diluting box 60. The nitrogen stored in the storage buffer 76 can be supplied to the fuel cell stack 12.

A method of shutting down the fuel cell system 10 according to a second embodiment of the present invention will be described below with reference to the timing chart shown in FIG. 11.

As described above, the fuel cell system 10, which is mounted on a fuel cell automobile (not shown), operates normally to propel the fuel cell automobile. When the ignition switch (not shown) of the fuel cell automobile is turned off, the method of shutting down the fuel cell system 10 is initiated.

Figure 12:
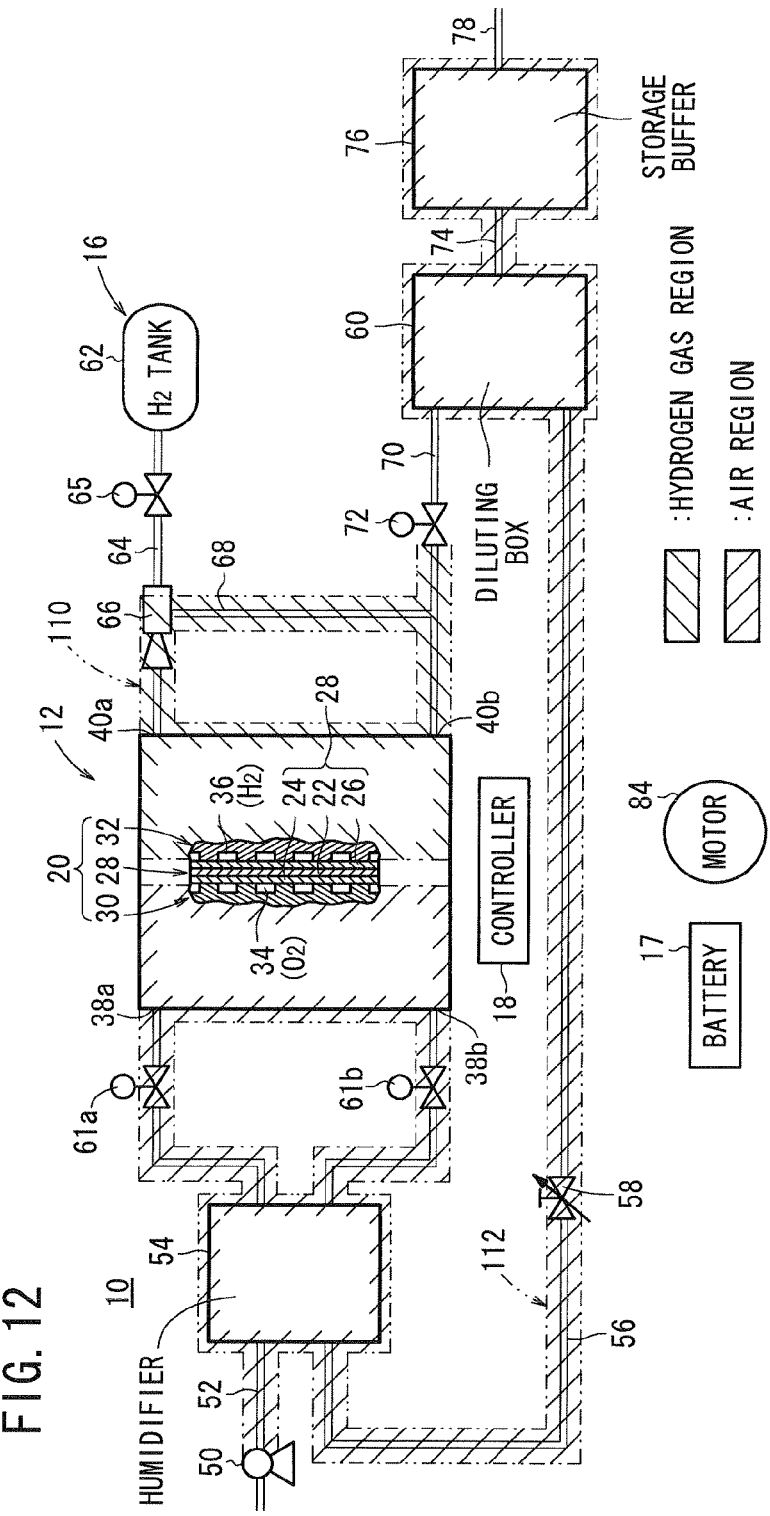
FIG. 12 is a block diagram illustrative of a hydrogen gas volume region and an air gas volume region in the fuel cell system.

First, the pressure at which hydrogen gas, i.e., a fuel gas, is supplied is preset in order to keep the fuel gas pressure in the fuel cell stack 12 at a preset pressure after a discharging process, to be described later, is carried out. More specifically, as shown in FIG. 12, a hydrogen gas volume region 110, which is filled with hydrogen gas and closed, includes the fuel gas flow field 36, the fuel gas inlet passage 40a, and the fuel gas outlet passage 40b in the fuel cell stack 12, a region of the hydrogen supply passageway 64 that extends downstream of the ejector 66, the hydrogen circulation path 68, and a region of the off-gas passageway 70 that extends upstream of the purge valve 72.

An air gas volume region 112, which replaces an air atmosphere with a nitrogen atmosphere, includes the oxygen-containing gas flow field 34, the oxygen-containing gas inlet passage 38a, and the oxygen-containing gas outlet passage 38b in the fuel cell stack 12, the air supply passageway 52, the air discharge passageway 56, the humidifier 54, the diluting box 60, and the storage buffer 76.

During the discharging process, air is supplied at a low oxygen stoichiometry, which is lower than the oxygen stoichiometry in a normal electric generation mode of the fuel cell stack 12. The low oxygen stoichiometry is set to about 1. At this time, the supply of hydrogen gas is stopped.

Oxygen remaining in the fuel cell stack 12, which is to be replaced with a nitrogen atmosphere by the air gas volume region 112, has a molar number NO2. Oxygen in the humidifier 54, the diluting box 60, and the storage buffer 76, which is to be replaced with a nitrogen atmosphere by the low oxygen stoichiometry supplied by the air pump 50, has a molar number N'O2. Hydrogen remaining in the hydrogen gas volume region 110 has a molar number NH2. The molar numbers NO2, N'O2 and NH2 are set so as to be related to each other by the equation $2(NO2+N'O2)=NH2$.

Figure 11:
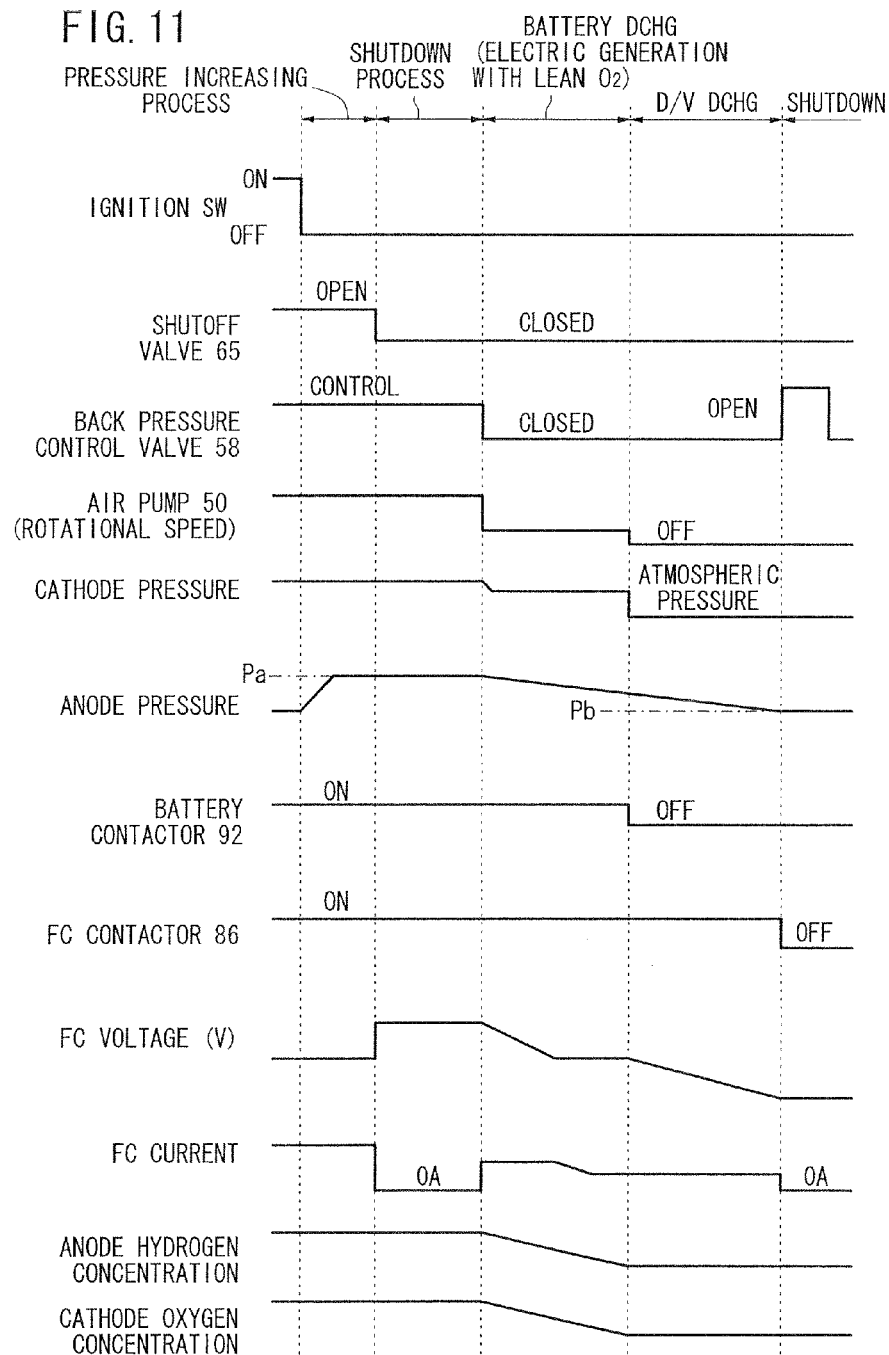
FIG. 11 is a timing chart illustrative of a method of shutting down a fuel cell system according to a second embodiment of the present invention.

A pressure Pa at which the hydrogen gas is supplied (anode pressure) is calculated from the set molar number NH2 of the remaining hydrogen, according to the equation N (molar number)=P (pressure)×V (volume)/R (gas constant)×T (absolute temperature) (see FIG. 11). The anode pressure Pa is set to be equal to or higher than a constant pressure Pb upon completion of the discharging process, where the constant pressure Pb refers to a pressure at which insufficient hydrogen or excessive hydrogen does not occur.

If the volume of the air gas volume region 112>>(is much greater than) the volume of the hydrogen gas volume region 110, then a process of increasing the pressure in the fuel cell stack 12 to the anode pressure Pa (second embodiment), or a process of supplying insufficient hydrogen (third embodiment) is carried out in order to increase the volume of the hydrogen gas volume region 110.

Conversely, if the volume of the hydrogen gas volume region 110>>the volume of the air gas volume region 112, then a process of reducing the pressure in the fuel cell stack 12 to the anode pressure Pa is carried out in order to reduce the volume of the hydrogen gas volume region 110.

Then, as shown in FIG. 11, when the ignition switch is turned off, the shutoff valve 65 is opened to supply hydrogen gas to the fuel cell stack 12, and the pressure in the fuel cell stack 12 rises to the anode pressure Pa (pressure increasing process). The anode pressure Pa is calculated according to the above equation.

After the pressure-increasing process, a shutdown process is initiated. In the shutdown process, the shutoff valve 65 is closed, and a scavenging process (cathode scavenging process) is performed using air on the cathodes. After the shutdown process, the back pressure control valve 58 is closed by stopping the opening process (see FIG. 7) thereof. The rotational speed of the air pump 50 of the oxygen-containing gas supply device 14 is reduced considerably, compared with the rotational speed during normal operation, thereby supplying the oxygen-containing gas at a low oxygen stoichiometry, which is lower than the oxygen stoichiometry in a normal electric generation mode of the fuel cell stack 12. The low oxygen stoichiometry is set to about 1.

The fuel cell stack 12 continues to generate electricity under a voltage (FC voltage), which is set to a higher voltage level than in the normal electric generation mode. A current collected from the fuel cell stack 12 (FC current) is set to a value for blocking hydrogen gas as the fuel gas from passing through the solid polymer electrolyte membranes 22 and moving from the anodes to the cathodes. In FIG. 2, the FC contactor 86 and the battery contactor 92 are turned on, thereby allowing the electricity generated by the fuel cell stack 12 to be supplied to charge the battery 17, after the voltage thereof has been reduced by the DC/DC converter 90.

As described above, the fuel cell stack 12 is supplied with air at a low oxygen stoichiometry, and the fuel cell stack 12 generates electricity while the fuel cell stack 12 is not being supplied with hydrogen gas as a result of the shutoff valve 65 being closed. The electricity generated by the fuel cell stack 12 is discharged as a result of being supplied to the battery 17 (battery DCHG in FIG. 11). When the voltage of the electricity generated by the fuel cell stack 12 drops to a given voltage, i.e., a voltage N1 (V) that is no longer applicable to the battery 17 and which is substantially the same as the voltage across the battery 17, the generated electricity is supplied only to the air pump 50.

In the fuel cell stack 12, the concentration of hydrogen at the anodes is lowered, and the concentration of oxygen at the cathodes is lowered. When the concentration of hydrogen at the anodes becomes equal to or lower than a predetermined pressure, the air pump 50 is turned off, and the battery contactor 92 is turned off.

As shown in FIG. 8, the fuel cell stack 12 generates electricity with the hydrogen gas and air that remain therein. The voltage of the electricity generated by the fuel cell stack 12 is lowered by the downverter 96, and then is supplied to charge the 12-V power supply 98 (D/V DCHG in FIG. 11). If necessary, the voltage also may be supplied to a radiator fan or the like, not shown. When the voltage of the electricity generated by the fuel cell stack 12 drops to a level approaching the operating limit voltage of the downverter 96, the back pressure control valve 58 is temporarily opened to atmospheric pressure, and the FC contactor 86 is turned off.

According to the second embodiment, when the ignition switch is turned off, the back pressure control valve 58, the air pump 50, and the shutoff valve 65 are actuated after the pressure in the fuel cell stack 12 is increased to the anode pressure Pa and before hydrogen gas stops being supplied. Therefore, the fuel cell stack 12 generates electricity with the remaining hydrogen gas and air, and the generated electricity is discharged as a result of being supplied to the battery 17.

The hydrogen concentration is reduced at the anodes in the fuel cell stack 12, whereas the oxygen concentration is reduced and the nitrogen concentration is increased at the cathodes in the fuel cell stack 12. At the cathodes, nitrogen gas having a high concentration is generated as a discharged gas, and is supplied to the diluting box 60 and the storage buffer 76. At the anodes, a negative pressure is developed due to the reduced hydrogen concentration, thereby allowing nitrogen gas to pass from the cathodes to the anodes through the solid polymer electrolyte membranes 22.

As shown in FIG. 12, the hydrogen gas volume region 110, which includes the fuel cell stack 12 and the air gas volume region 112, are filled with nitrogen as an inactive gas. The fuel cells 20 thus are prevented from becoming deteriorated insofar as possible with a simple and compact arrangement.

According to the second embodiment, furthermore, before supply of the hydrogen gas is stopped, the pressure at which the hydrogen gas is supplied to the fuel cell stack 12 is increased up to the anode pressure Pa. Therefore, while the fuel cell stack 12 is being filled with an appropriate amount of hydrogen, the fuel cell stack 12 generates electricity suitably at a low oxygen stoichiometry, thereby making it possible to reliably prevent excessive hydrogen gas from remaining in the fuel cell stack 12, and also to reliably prevent a negative anode pressure from being developed due to a shortage of hydrogen gas after the discharging process is completed.

Figure 13:
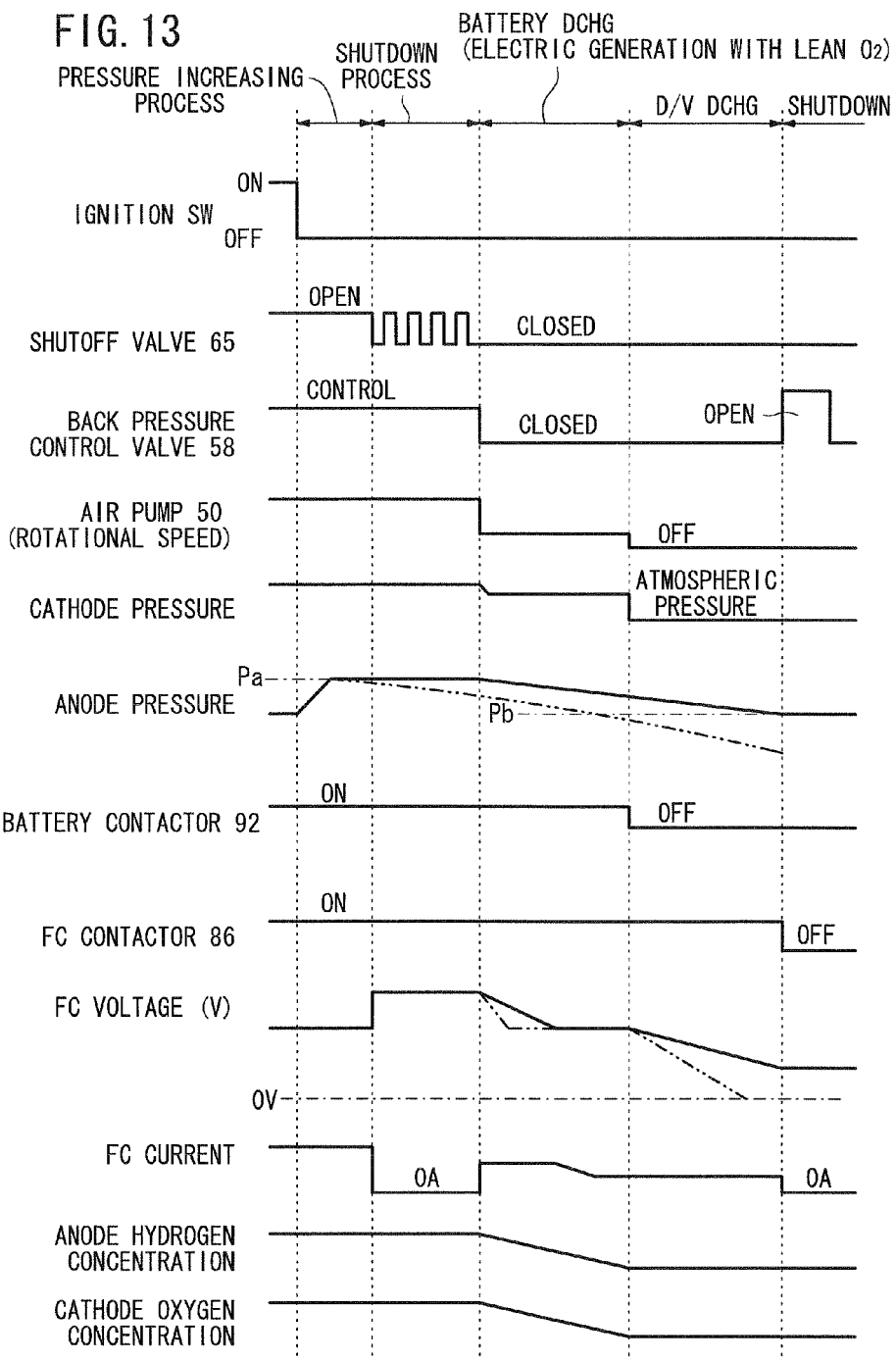
FIG. 13 is a timing chart illustrative of a method of shutting down a fuel cell system according to a third embodiment of the present invention.

FIG. 13 is a timing chart, which illustrates a method of shutting down a fuel cell system according to a third embodiment of the present invention.

With the fuel cell system 10, the hydrogen pressure in the fuel cell stack 12 may drop before the discharging process commences, after the hydrogen pressure has risen to the desired anode pressure Pa (see the two-dot-and-dash-line curve in FIG. 13). This is because, for example, due to deterioration in performance of the fuel cells 20, hydrogen gas may pass from the fuel gas flow field 36 into the oxygen-containing gas flow field 34, thereby resulting in a reduction in hydrogen pressure. Accordingly, the hydrogen pressure may drop to or below the constant pressure Pb after completion of the discharging process.

On the other hand, due to a deterioration in performance of the fuel cells 20, the voltage (FC voltage) tends to be lowered (see the two-dot-and-dash-line curve in FIG. 13). During the discharging process, the FC voltage may even drop to a negative voltage, which is lower than 0 V.

According to the third embodiment, therefore, when a drop in the anode voltage Pa is detected by the controller 18, the shutoff valve 65 is intermittently opened and closed. Accordingly the fuel cell stack 12 is intermittently supplied with hydrogen gas from the hydrogen tank 62, thereby maintaining the anode pressure Pa. Therefore, the third embodiment offers the same advantages as those of the second embodiment.

Figure 14:
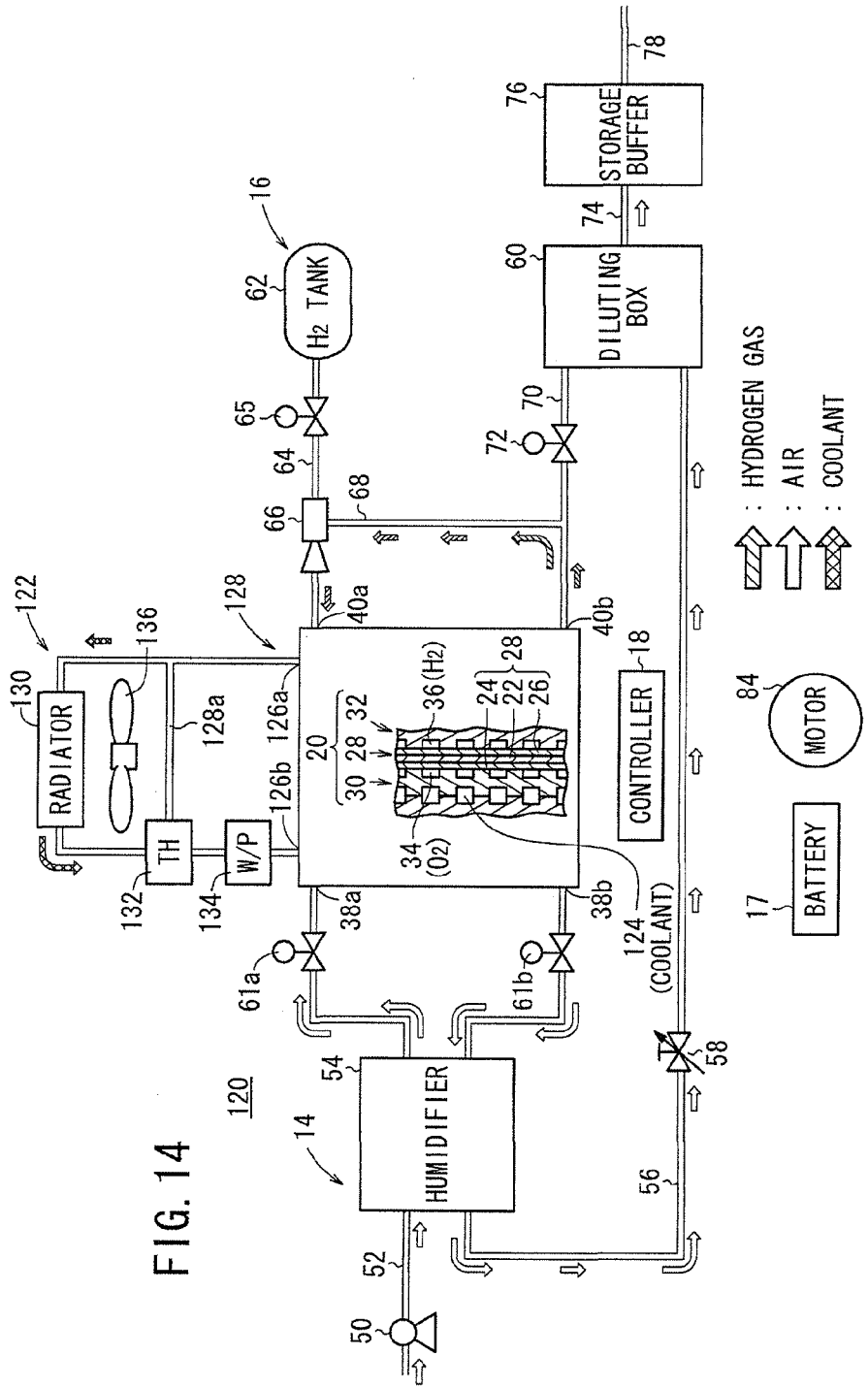
FIG. 14 is a schematic diagram of a fuel cell system on which a method of shutting down a fuel cell system according to a fourth embodiment of the present invention is carried out.

FIG. 14 shows a fuel cell system 120 on which a method of shutting down a fuel cell system according to a fourth embodiment of the present invention is carried out. As shown in FIG. 14, the fuel cell system 120 includes a fuel cell stack 12, an oxygen-containing gas supply device 14 for supplying an oxygen-containing gas to the fuel cell stack 12, a coolant supply device 122 for supplying a coolant to the fuel cell stack 12, a fuel gas supply device 16 for supplying a fuel gas to the fuel cell stack 12, a battery (electric storage device) 17 that is connectable to the fuel cell stack 12, and a controller 18 for controlling the fuel cell system 10 in its entirety. Components of the fuel cell system 120, which are identical to those of the fuel cell system 10, are denoted by identical reference characters, and such features will not be described in detail below.

A coolant flow field 124 is defined between each of the fuel cells 20. The fuel cell stack 12 comprises an oxygen-containing gas inlet passage 38a, a fuel gas inlet passage 40a, a coolant inlet passage 126a for supplying a coolant such as pure water or ethylene glycol, an oxygen-containing gas outlet passage 38b, a fuel gas outlet passage 40b, and a coolant outlet passage 126b for discharging the coolant, all of which extend through the stacked fuel cells 20.

The coolant supply device 122 includes a coolant circulation path 128 for circulating the coolant to the fuel cell stack 12. The coolant circulation path 128 is held in fluid communication with the coolant inlet passage 126a and the coolant outlet passage 126b. The coolant circulation path 128 is connected to a radiator 130, a thermostat 132, and a pump 134 for circulating the coolant. The radiator 130 is combined with a radiator fan 136.

Figure 15:
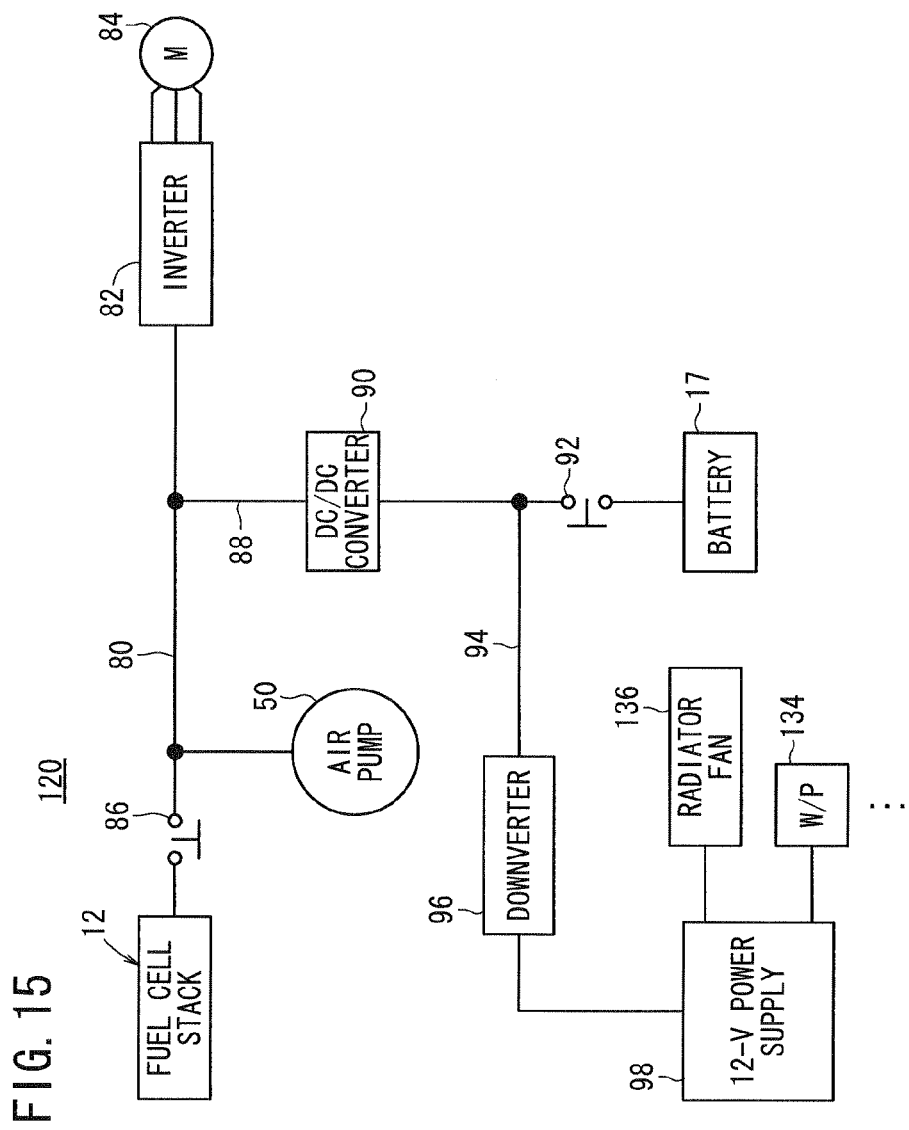
FIG. 15 is a block diagram of the fuel cell system.

A bypass passageway 128a that bypasses the radiator 130 is connected to the thermostat 132. The thermostat 132 selectively brings the radiator 130 and the bypass passageway 128a into fluid communication with the coolant circulation path 128, based on the temperature of the coolant. As shown in FIG. 15, the 12-V power supply 98 is connected to various fuel cell auxiliaries, for example, the radiator fan 136 and the pump 134.

As with the first embodiment, the method of shutting down the fuel cell system 120 is carried out according to the timing chart shown in FIG. 3.

In the coolant supply device 122, the coolant inlet passage 126a and the coolant outlet passage 126b of the fuel cell stack 12 are connected to a coolant circulation path 128, which is connected to a coolant pump 134. When the coolant pump 134 is operated, the coolant pump 134 introduces the coolant from the coolant circulation path 128 into the coolant inlet passage 126a, from which the coolant flows through a coolant flow field 124 in each of the fuel cells 20. After having cooled the fuel cells 20, the coolant is discharged from the coolant outlet passage 126b back into the coolant circulation path 128.

In the coolant supply device 122, in the discharging process, the pump 134 is actuated in order to circulate the coolant through the coolant circulation path 128 and the fuel cell stack 12, and to deliver the coolant to the radiator 130. When the coolant passes through the radiator 130, the coolant is cooled by air, which is blown by the radiator fan 136, for thereby cooling the fuel cell stack 12 to a temperature in the vicinity of ambient air temperature.

When the voltage of the electricity generated by the fuel cell stack 12 drops to a level near the operating limit voltage of the downverter 96, the back pressure control valve 58 is temporarily opened to atmospheric pressure, and the FC contactor 86 is turned off.

According to the fourth embodiment, when the fuel cell stack 12 generates electricity after air stops being supplied thereto, the electricity generated by the fuel cell stack 12 is supplied to the 12-V power supply 98. The 12-V power supply 98 then supplies the electricity to the fuel cell auxiliaries, e.g., the radiator fan 136 and the pump 134. Electricity generated by the fuel cell stack 12 at this time is consumed, i.e., is discharged, reliably.

Figure 16:
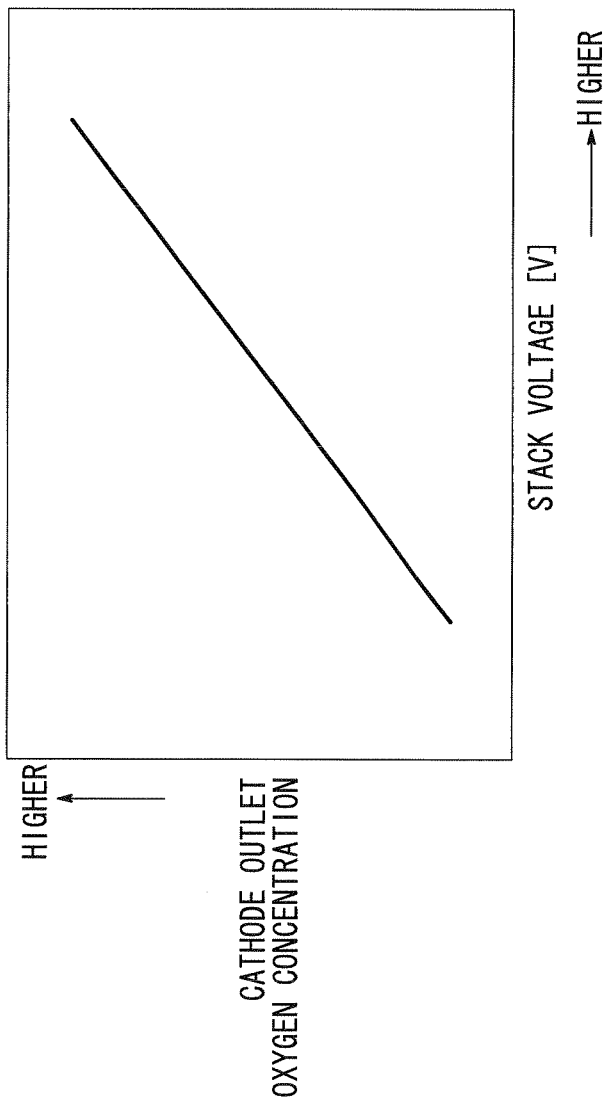
FIG. 16 is a diagram showing a relationship between stack voltage and oxygen concentration.

As shown in FIG. 16, the voltage of the fuel cell stack 12, i.e., the stack voltage, can be lowered to a low voltage, thereby further reducing the oxygen concentration in the fuel cell stack 12. While the fuel cell stack 12 is being shut down, therefore, the solid polymer electrolyte membranes 22 are prevented from becoming deteriorated due to a mixture of hydrogen and oxygen. Moreover, when the fuel cell stack 12 begins to operate, the fuel cell stack 12 is prevented from suffering from a startup failure by blocking a corrosion current due to a shortage of oxygen.

In the discharging process, the coolant supply device 122 cools the fuel cell stack 12. Consequently, as shown in FIG. 17, the fuel cells 20, which generally are more likely to become deteriorated at higher temperatures, are not exposed to high temperatures, but are prevented from becoming deteriorated while the fuel cells 20 are being shut down, and also are prevented from becoming deteriorated when the fuel cells 20 start to operate.

If the fuel cell stack 12 undergoes a temperature drop while being shut down, then the fuel cell stack 12 draws in air from outside of the fuel cell system 10, thus causing the concentration of the oxygen-containing gas in the fuel cell stack 12 to rise. By shutting down the fuel cell stack 12 while it is being cooled, the fuel cell stack 12 undergoes almost no temperature drop during shut down thereof, and the amount of drawn in air is reduced, and further, the rate at which the oxygen concentration increases also is reduced. Consequently, it is possible to minimize deterioration of the fuel cell stack 12 with a simple and compact arrangement.

Although certain preferred embodiments of the present invention have been shown and described in detail, it should be understood that various changes and modifications may be made to the embodiments without departing from the scope of the invention as set forth in the appended claims.

What is claimed is:

1. A method of shutting down a fuel cell system including a fuel cell for generating electricity from an electrochemical reaction between an oxygen-containing gas supplied to a cathode and a fuel gas supplied to an anode, an oxygen-containing gas supply device for supplying the oxygen-containing gas to the fuel cell, and a fuel gas supply device for supplying the fuel gas to the fuel cell, the method comprising:
   a first step of supplying the oxygen-containing gas and the fuel gas to the fuel cell to cause the fuel cell to generate electricity; and
   a second step of stopping supply of the fuel gas while supplying the oxygen-containing gas to the fuel cell to cause the fuel cell to generate electricity upon detection of a command to shut down the fuel cell,
   wherein, in the second step, when the pressure of the fuel gas at the anode is lowered to a preset lower-limit value based on an anode pressure, which actually is measured, the fuel cell is caused to stop generating electricity, and wherein the preset lower-limit value is an anode critical pressure, at which the potential at the anode starts to increase when the pressure of the fuel gas is lowered.

2. A method according to claim 1, wherein, in the second step, the oxygen-containing gas is supplied to the fuel cell at a low oxygen stoichiometry, which is lower than the oxygen stoichiometry in a normal electric generation mode of the fuel cell.

3. The method according to claim 2, wherein the low oxygen stoichiometry is set to about 1.

4. A method of shutting down a fuel cell system including a fuel cell for generating electricity from an electrochemical reaction between an oxygen-containing gas supplied to a cathode and a fuel gas supplied to an anode, an oxygen-containing gas supply device for supplying the oxygen-containing gas to the fuel cell, and a fuel gas supply device for supplying the fuel gas to the fuel cell, the method comprising:
   a first step of supplying the oxygen-containing gas and the fuel gas to the fuel cell to cause the fuel cell to generate electricity; and
   a second step of stopping supply of the fuel gas while supplying the oxygen-containing gas to the fuel cell to cause the fuel cell to generate electricity upon detection of a command to shut down the fuel cell,
   wherein, in the second step, when the pressure of the fuel gas at the anode is lowered to a preset lower-limit value based on an anode pressure, which actually is measured, the fuel cell is caused to stop generating electricity, and wherein, in the second step, the anode pressure is measured, a water vapor partial pressure is calculated, and the pressure of the fuel gas is calculated by subtracting the water vapor partial pressure from the anode pressure.

5. A method of shutting down a fuel cell system including a fuel cell for generating electricity from an electrochemical reaction between an oxygen-containing gas supplied to a cathode and a fuel gas supplied to an anode, an oxygen-containing gas supply device for supplying the oxygen-containing gas to the fuel cell, and a fuel gas supply device for supplying the fuel gas to the fuel cell, the method comprising:
   a first step of supplying the oxygen-containing gas and the fuel gas to the fuel cell to cause the fuel cell to generate electricity; and
   a second step comprising adjusting a pressure at which the fuel gas is supplied before stopping supply of the fuel gas in order to keep the pressure of the fuel gas at a constant pressure or higher in the fuel cell when the second step is finished and supplying the oxygen-containing gas to the fuel cell at a low oxygen stoichiometry, which is lower than the oxygen stoichiometry in a normal electric generation mode of the fuel cell, to thereby cause the fuel cell to generate electricity upon detection of a command to shut down the fuel cell.

6. The method according to claim 5, wherein, in the second step, before the fuel cell starts to generate electricity at the low oxygen stoichiometry after the shutdown command has been detected, the fuel gas is supplied when the pressure of the fuel gas in the fuel cell becomes equal to or lower than the constant pressure.

7. The method according to claim 5, wherein, in the second step, when the fuel cell generates electricity at the low oxygen stoichiometry, the fuel gas is supplied upon a voltage reversal of the generated electricity.

8. The method according to claim 5, wherein the low oxygen stoichiometry is set to about 1.

9. A method of shutting down a fuel cell system including a fuel cell for generating electricity from an electrochemical reaction between an oxygen-containing gas supplied to a cathode and a fuel gas supplied to an anode, an oxygen-containing gas supply device for supplying the oxygen-containing gas to the fuel cell, a fuel gas supply device for supplying the fuel gas to the fuel cell, and an electric storage device connectable to the fuel cell, the method comprising: a step of supplying the oxygen-containing gas and the fuel gas to the fuel cell to cause the fuel cell to generate electricity;
a step of stopping supply of the fuel gas and supplying the oxygen-containing gas to the fuel cell at a low oxygen stoichiometry, which is lower than the oxygen stoichiometry in a normal electric generation mode of the fuel cell, to cause the fuel cell to generate electricity upon detection of a command to shut down the fuel cell; and
a step of supplying the electricity generated by the fuel cell to the electric storage device
wherein when a voltage of the electricity generated by the fuel cell drops to a preset voltage or lower, supply of the electricity generated by the fuel cell to the electric storage device is stopped, and the electricity is supplied only to a pump of the oxygen-containing gas supply device.

10. A method of shutting down a fuel cell system including a fuel cell for generating electricity from an electrochemical reaction between an oxygen-containing gas supplied to a cathode and a fuel gas supplied to an anode, an oxygen-containing gas supply device for supplying the oxygen-containing gas to the fuel cell, a fuel gas supply device for supplying the fuel gas to the fuel cell, and an electric storage device connectable to the fuel cell, the method comprising: a step of supplying the oxygen-containing gas and the fuel gas to the fuel cell to cause the fuel cell to generate electricity;
a step of stopping supply of the fuel gas and supplying the oxygen-containing gas to the fuel cell at a low oxygen stoichiometry, which is lower than the oxygen stoichiometry in a normal electric generation mode of the fuel cell, to cause the fuel cell to generate electricity upon detection of a command to shut down the fuel cell, wherein the low oxygen stoichiometry is set to a value that becomes higher as the ambient air temperature is lower; and
a step of supplying the electricity generated by the fuel cell to the electric storage device.

11. A method of shutting down a fuel cell system including a fuel cell for generating electricity from an electrochemical reaction between an oxygen-containing gas supplied to a cathode and a fuel gas supplied to an anode, an oxygen-containing gas supply device for supplying the oxygen-containing gas to the fuel cell, a fuel gas supply device for supplying the fuel gas to the fuel cell, and an electric storage device connectable to the fuel cell, the method comprising: a step of supplying the oxygen-containing gas and the fuel gas to the fuel cell to cause the fuel cell to generate electricity;
a step of stopping supply of the fuel gas and supplying the oxygen-containing gas to the fuel cell at a low oxygen stoichiometry, which is lower than the oxygen stoichiometry in a normal electric generation mode of the fuel cell, to cause the fuel cell to generate electricity upon detection of a command to shut down the fuel cell; and
a step of supplying the electricity generated by the fuel cell to the electric storage device;
wherein the oxygen-containing gas supply device includes a discharge passageway for discharging the oxygen-containing gas, which has been used, from the fuel cell, the discharge passageway being connected to a normally closed back pressure control valve for regulating the pressure of the oxygen-containing gas, and wherein after a shutdown process is finished, the normally closed back pressure control valve closes the discharge passageway.

12. The method according to claim 11, wherein the oxygen-containing gas supply device includes an on-off valve connected to the discharge passageway upstream of the normally closed back pressure control valve, and wherein after the shutdown process is finished, the on-off valve closes the discharge passageway.

13. The method according to claim 11, wherein the oxygen-containing gas supply device includes a diluting box connected to the discharge passageway downstream of the normally closed back pressure control valve, and wherein when the shutdown process is carried out, the normally closed back pressure control valve is opened to store discharged gas in the diluting box.

14. The method according to claim 13, wherein the fuel cell system includes a storage buffer connected to the discharge passageway downstream of the diluting box, and wherein when the shutdown process is carried out, the normally closed back pressure control valve is opened to store the discharged gas in the diluting box and the storage buffer.

15. A method of shutting down a fuel cell system including a fuel cell for generating electricity from an electrochemical reaction between an oxygen-containing gas supplied to a cathode and a fuel gas supplied to an anode, an oxygen-containing gas supply device for supplying the oxygen-containing gas to the fuel cell, a fuel gas supply device for supplying the fuel gas to the fuel cell, a coolant supply device for supplying a coolant to the fuel cell, and an electric storage device connectable to the fuel cell, the method comprising:
a first step of supplying the oxygen-containing gas and the fuel gas to the fuel cell to cause the fuel cell to generate electricity; and
a second step of stopping supply of the fuel gas and supplying the oxygen-containing gas to the fuel cell at a low oxygen stoichiometry, which is lower than the oxygen stoichiometry in a normal electric generation mode of the fuel cell, to thereby cause the fuel cell to generate electricity, and supplying the electricity generated by the fuel cell to the electric storage device upon detection of a command to shut down the fuel cell; and
a third step of stopping supply of the oxygen-containing gas at the low oxygen stoichiometry to the fuel cell, thereafter causing the fuel cell to generate electricity only with gases that remain in the fuel cell, and supplying the electricity generated by the fuel cell to the coolant supply device;
wherein a voltage of the electricity generated by the fuel cell is lowered by a downverter, and thereafter the voltage is supplied to the coolant supply device.

16. The method according to claim 15, wherein the coolant supply device includes a radiator for cooling the coolant, a radiator fan combined with the radiator, and a pump for circulating the coolant to the fuel cell, and wherein, in the third step, the electricity generated by the fuel cell is supplied to the radiator fan and the pump.

17. The method according to claim 15, wherein the low oxygen stoichiometry is set to about 1.

* * * * *